United States Patent
Dutta

(10) Patent No.: US 11,431,618 B2
(45) Date of Patent: Aug. 30, 2022

(54) FLEXIBLE PATH ENCODING IN PACKET SWITCHED NETWORKS

(71) Applicant: Nokia Solutions and Networks Oy, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/576,090

(22) Filed: Sep. 19, 2019

(65) Prior Publication Data

US 2021/0092048 A1 Mar. 25, 2021

(51) Int. Cl.
| | | |
|---|---|---|
| *H04L 45/00* | (2022.01) | |
| *H04L 45/302* | (2022.01) | |
| *H04L 45/44* | (2022.01) | |
| *H04L 45/64* | (2022.01) | |
| *H04L 45/745* | (2022.01) | |

(52) U.S. Cl.
CPC ............ *H04L 45/22* (2013.01); *H04L 45/306* (2013.01); *H04L 45/44* (2013.01); *H04L 45/64* (2013.01); *H04L 45/745* (2013.01)

(58) Field of Classification Search
CPC ....... H04L 45/22; H04L 45/306; H04L 45/44; H04L 45/64; H04L 45/745
See application file for complete search history.

(56) References Cited

U.S. PATENT DOCUMENTS

| | | | |
|---|---|---|---|
| 7,315,510 B1 * | 1/2008 | Owens | H04L 12/462 370/218 |
| 9,794,148 B1 | 10/2017 | Ramachandran | |
| 10,020,984 B1 | 7/2018 | Jork et al. | |
| 10,536,324 B2 * | 1/2020 | Wijnands | H04L 45/28 |
| 10,616,063 B1 * | 4/2020 | Dutta | H04L 65/607 |
| 2006/0159009 A1 | 7/2006 | Kim | |

(Continued)

OTHER PUBLICATIONS

Gredler, H., et al., "North-Bound Distribution of Link-State and Traffic Engineering (TE) Information Using BGP", Internet Engineering Task Force, RFC 7752, Mar. 2016, 48 pages.

(Continued)

*Primary Examiner* — Duc C Ho
(74) *Attorney, Agent, or Firm* — Tong, Rea, Bentley & Kim, LLC

(57) ABSTRACT

Various example embodiments for supporting packet forwarding in communication networks are presented. Various example embodiments for supporting packet forwarding in communication networks may be configured to support forwarding of source routed packets in packet switched networks based on flexible path encoding. Various example embodiments for supporting forwarding of a source routed packet based on flexible path encoding may be configured to support forwarding of the source routed packets based on use of a bit string configured to encode the path for the source routed packet. Various example embodiments for supporting forwarding of source routed packets based on flexible path encoding may be configured to support forwarding of source routed packets based on various types of source routing, such as Segment Routing (SR), SR-Traffic Engineering (SR-TE), or the like.

20 Claims, 20 Drawing Sheets

(56) References Cited

U.S. PATENT DOCUMENTS

| | | |
|---|---|---|
| 2007/0127372 A1 | 6/2007 | Khan et al. |
| 2008/0025309 A1 | 1/2008 | Swallow |
| 2008/0159301 A1 | 7/2008 | de Heer et al. |
| 2009/0238084 A1 | 9/2009 | Nadeau |
| 2009/0292942 A1 | 11/2009 | Bhat |
| 2009/0292943 A1 | 11/2009 | Hanif |
| 2010/0106999 A1 | 4/2010 | Hanif |
| 2013/0010589 A1 | 1/2013 | Kini |
| 2013/0336192 A1 | 12/2013 | Zhao |
| 2014/0169370 A1* | 6/2014 | Filsfils ............... H04L 45/38 370/392 |
| 2014/0269266 A1* | 9/2014 | Filsfils ............... H04L 43/50 370/228 |
| 2014/0330986 A1 | 11/2014 | Bowes et al. |
| 2015/0117203 A1 | 4/2015 | Filsfils |
| 2015/0256456 A1 | 9/2015 | Previdi et al. |
| 2016/0028625 A1* | 1/2016 | Hari ............... H04L 45/74 370/392 |
| 2016/0173366 A1 | 6/2016 | Saad et al. |
| 2016/0254987 A1* | 9/2016 | Eckert ............... H04L 45/28 370/390 |
| 2016/0277290 A1 | 9/2016 | Sivabalan et al. |
| 2017/0005920 A1 | 1/2017 | Previdi et al. |
| 2017/0222920 A1* | 8/2017 | Thubert ............... H04L 45/16 |
| 2017/0289105 A1* | 10/2017 | Minakuchi ......... H04L 63/1491 |
| 2017/0295089 A1 | 10/2017 | Saltsidis |
| 2017/0346718 A1* | 11/2017 | Psenak ............... H04L 45/02 |
| 2018/0262440 A1 | 9/2018 | Sitaraman |
| 2018/0367450 A1 | 12/2018 | Sitaraman et al. |
| 2019/0007372 A1 | 1/2019 | Bhat et al. |
| 2019/0319876 A1* | 10/2019 | Gumaste ............... H04L 45/28 |
| 2020/0014585 A1 | 1/2020 | Agarwal |
| 2020/0287824 A1 | 9/2020 | Dutta |
| 2020/0344162 A1* | 10/2020 | Dutta ............... H04L 47/724 |
| 2020/0382416 A1 | 12/2020 | Hu |
| 2020/0403861 A1 | 12/2020 | Saad |

OTHER PUBLICATIONS

Filsfils C., et al., "Segment Routing Architecture" Internet Engineering Task Force, RFC 8402, Jul. 2018, 32 pages.
Bashandy, A., et al., "Segment Routing with MPLS data plane" draft-ietf-segment-routing-mpls-18, Network Working Group, Dec. 8, 2018, 38 pages.
Filsfils, C., et al., "IPV6 Segment Routing Header (SRH)" draft-ietf-6man-segment-routing-header-15, Oct. 22, 2018, 28 pages.
Information Science Institute, Internet Protocol, DARPA Internet Program, Protocol Specification, RFC 791, Sep. 1981, 49 pages.
Atlas, A., et al., "Basic Specification for IP Fast Reroute: Loop-Free Alternates", Network Working Group, RFC 5286, Sep. 2008, 31 pages.
Bryant, S., et al., "Remote Loop-Free Alternate (LFA) Fast Reroute (FRR)", Internet Engineering Task Force, RFC 7490, Apr. 2015, 29 pages.
Francois, P., et al., "Topology Independent Fast Reroute using Segment Routing", draft-francois-segment-routing-ti-lfa-00, Network Working Group, Nov. 18, 2013, 10 pages.
Hedge, S., et al., "Node Protection for SR-TE Paths", draft-hedge-spring-node-protection-for-sr-te-paths-04, Routing Area, Oct. 17, 2018, 11 pages.
Iana, "Special-Purpose Multiprotocol Label Switching (MPLS) Label Values," https://www.iana.org/assignments/mpls-label-values/mpls-label-values.xhtml, printed on Sep. 19, 2019, 2 pages.
Iana, "IEEE 802 Numbers," https://www.iana.org/assignments/ieee-802-numbers/ieee-802-numbers.xhtml, printed on Sep. 19, 2019, 15 pages.
Iana, "DSCP Code Points," https://www.iana.org/assignments/dscp-registry/dscp-registry.xhtml, printed on Sep. 19, 2019, 3 pages.
Iana, "Assigned Internet Protocol Numbers," https://www.iana.org/assignments/protocol-numbers/protocol-numbers.xhtml, printed on Sep. 19, 2019, 10 pages.
Extended EP Search Report mailed in corresponding EP 20196958.1 dated Jan. 12, 2021, 10 pages.

* cited by examiner

*FIG. 2*

| PREFIX SEGMENT | BIT POSITION |
|---|---|
| R1 | 1 |
| R2 | 2 |
| R3 | 3 |
| R4 | 4 |
| R5 | 5 |
| R6 | 6 |
| R7 | 7 |
| R8 | 8 |

| ADJACENCY SEGMENT | BIT POSITION |
|---|---|
| R1->R2 | 9 |
| R2->R1 | 10 |
| R2->R3 | 11 |
| R2->R4 | 12 |
| R2->R5 | 13 |
| R3->R2 | 14 |
| R3->R4 | 15 |
| R3->R5 | 16 |
| R4->R2 | 17 |
| R4->R3 | 18 |
| R4->R5 | 19 |
| R4->R6 | 20 |
| R4->R7 | 21 |
| R5->R2 | 22 |
| R5->R3 | 23 |
| R5->R4 | 24 |
| R5->R6 | 25 |
| R5->R7 | 26 |
| R6->R4 | 27 |
| R6->R5 | 28 |
| R6->R7 | 29 |
| R6->R8 | 30 |
| R7->R4 | 31 |
| R7->R5 | 32 |
| R7->R6 | 33 |
| R7->R8 | 34 |
| R8->R6 | 35 |
| R8->R7 | 36 |

| BIT POSITION | NEXT-HOP | IS LOCAL SEGMENT? |
|---|---|---|
| 1 | R2->R1 | NO |
| 2 | SELF | NO |
| 3 | R2->R3 | NO |
| 4 | R2->R4 | NO |
| 5 | R2->R3 | NO |
| 6 | R2->R4 | NO |
| 7 | R2->R4 | NO |
| 8 | R2->R4 | NO |
| 9 | INVALID | INVALID |
| 10 | R2->R1 | YES |
| 11 | R2->R3 | YES |
| 12 | R2->R4 | YES |
| 13 | R2->R5 | YES |
| 14 | INVALID | INVALID |
| .... | .... | ....... |
| ..... | ..... | ...... |
| 36 | INVALID | INVALID |

*FIG. 4*

| NEXT-HOP | LINK PROTECTION DETOUR PATHS |
|---|---|
| R2->R1 | NONE |
| R2->R3 | {R2->R4, R4->R3} |
| R2->R4 | {R2->R3, R3->R4} |
| R2->R5 | {R2->R3, R3->R5} |

F-BM = 111101111111

| BIT POSITION | NEXT-HOP | LINK PROTECTION DETOUR/BIT STRING | IS LOCAL SEGMENT? |
|---|---|---|---|
| 1 | R2->R1 | NONE | NO |
| 2 | SELF | NONE | NO |
| 3 | R2->R3 | {R2->R4, R4->R3}/ {12, 18} | NO |
| 4 | R2->R4 | {R2->R3, R3->R4}/ {11, 15} | NO |
| 5 | R2->R3 | {R2->R4, R4->R3}/ {12, 18} | NO |
| 6 | R2->R4 | {R2->R3, R3->R4}/ {11, 15} | NO |
| 7 | R2->R4 | {R2->R3, R3->R4}/ {11, 15} | NO |
| 8 | R2->R4 | {R2->R3, R3->R4}/ {11, 15} | NO |
| 9 | INVALID | INVALID | INVALID |
| 10 | R2->R1 | NONE | YES |
| 11 | R2->R3 | {R2->R4, R4->R3}/ {12, 18} | YES |
| 12 | R2->R4 | {R2->R3, R3->R4}/ {11, 15} | YES |
| 13 | R2->R5 | {R2->R3, R3->R5}/ {11, 16} | YES |
| 14 | INVALID | INVALID | INVALID |
| .... | .... | | ....... |
| ..... | ..... | | ...... |
| 36 | INVALID | INVALID | INVALID |

| BIT POSITION | NEXT-HOP | LINK PROTECTION DETOUR / BIT STRING | NODE PROTECTION BACKUP NEXT-HOP | IS LOCAL SEGMENT? |
|---|---|---|---|---|
| 1 | R2->R1 | NONE | NONE | NO |
| 2 | SELF | NONE | NONE | NO |
| 3 | R2->R3 | {R2->R4, R4->R3}/ {12, 18} | NONE | NO |
| 4 | R2->R4 | {R2->R3, R3->R4}/ {11, 15} | NONE | NO |
| 5 | R2->R3 | {R2->R4, R4->R3}/ {12, 18} | NONE | NO |
| 6 | R2->R4 | {R2->R4, R4->R3}/ {12, 18} | R2->R5 | NO |
| 7 | R2->R4 | {R2->R4, R4->R3}/ {12, 18} | R2->R5 | NO |
| 8 | R2->R4 | {R2->R4, R4->R3}/ {12, 18} | R2->R5 | NO |
| 9 | INVALID | INVALID | INVALID | INVALID |
| 10 | R2->R1 | NONE | NONE | YES |
| 11 | R2->R3 | {R2->R4, R4->R3}/ {12, 18} | NONE | YES |
| 12 | R2->R4 | {R2->R3, R3->R4}/ {11, 15} | NONE | YES |
| 13 | R2->R5 | {R2->R3, R3->R5}/ {11, 16} | NONE | YES |
| 14 | INVALID | INVALID | INVALID | INVALID |
| .... | .... | .... | .... | ........ |
| ..... | ..... | ...... | ..... | ...... |
| 36 | INVALID | INVALID | INVALID | INVALID |

*FIG. 7*

| SD=0 | |
|---|---|
| Prefix Segment | Bit Position |
| R1 | 1 |
| R2 | 2 |
| R3 | 3 |
| R4 | 4 |
| R5 | 5 |
| R6 | 6 |

| Adjacency Segment | Bit Position |
|---|---|
| R1->R2 | 7 |
| R1->R3 | 8 |
| R2->R1 | 9 |
| R2->R3 | 10 |
| R2->R4 | 11 |
| R2->R6 | 12 |
| R3->R1 | 13 |
| R3->R2 | 14 |
| R3->R4 | 15 |
| R4->R2 | 16 |
| R4->R3 | 17 |
| R4->R6 | 18 |
| R5->R6 | 19 |
| R6->R2 | 20 |
| R6->R4 | 21 |
| R6->R5 | 22 |
| R6->R9 | 23 |
| R6->R11 | 24 |

| SD=1 | |
|---|---|
| Prefix Segment | Bit Position |
| R7 | 1 |
| R8 | 2 |
| R9 | 3 |
| R10 | 4 |

| Adjacency Segment | Bit Position |
|---|---|
| R7->R8 | 5 |
| R7->R9 | 6 |
| R8->R7 | 7 |
| R8->R9 | 8 |
| R8->R10 | 9 |
| R9->R6 | 10 |
| R9->R7 | 11 |
| R9->R8 | 12 |
| R9->R10 | 13 |
| R10->R8 | 14 |
| R10->R9 | 15 |
| R10->R11 | 16 |

| SD=2 | |
|---|---|
| Prefix Segment | Bit Position |
| R11 | 1 |
| R12 | 2 |
| R13 | 3 |
| R14 | 4 |

| Adjacency Segment | Bit Position |
|---|---|
| R11->R6 | 5 |
| R11->R10 | 6 |
| R11->R12 | 7 |
| R11->R13 | 8 |
| R12->R11 | 9 |
| R12->R13 | 10 |
| R12->R14 | 11 |
| R13->R11 | 12 |
| R13->R12 | 13 |
| R13->R14 | 14 |
| R14->R13 | 15 |
| R14->R13 | 16 |

| BIT POSITION | NEXT-HOP | LINK PROTECTION DETOUR/BIT STRING | NODE PROTECTION BACKUP NEXT-HOP | IS LOCAL SEGMENT ? |
|---|---|---|---|---|
| 1 | R2->R1 | NONE | NONE | NO |
| 2 | SELF | NONE | NONE | NO |
| 3 | R2->R3 | {R2->R3, R3->R1}/ {10, 13} | NONE | NO |
| 4 | R2->R4 | {R2->R3, R3->R4}/ {10, 15} | NONE | NO |
| 5 | R2->R6 | {R2->R4, R4->R6}/ {11, 18} | NONE | NO |
| 6 | R2->R6 | {R2->R4, R4->R6}/ {11, 18} | NONE | NO |
| 7 | INVALID | INVALID | INVALID | INVALID |
| 8 | INVALID | INVALID | INVALID | INVALID |
| 9 | R2->R1 | {R2->R3, R3->R1}/ {10, 13} | NONE | YES |
| 10 | R2->R3 | {R2->R4, R4->R3}/ {11,17} | NONE | YES |
| 11 | R2->R4 | {R2->R3, R3->R4}/ {10, 15} | NONE | YES |
| 12 | R2->R6 | {R2->R4, R4->R6}/ {11, 18} | NONE | YES |
| 13 | INVALID | INVALID | INVALID | INVALID |
| .... | .... | .... | .... | ....... |
| 256 | INVALID | INVALID | INVALID | INVALID |

| BIT POSITION | NEXT-HOP | LINK PROTECTION DETOUR/BIT STRING | NODE PROTECTION BACKUP NEXT-HOP | IS LOCAL SEGMENT ? |
|---|---|---|---|---|
| 1 | R2->R6 | {R2->R4, R4->R6}/ {11, 18} | NONE | NO |
| 2 | R2->R6 | {R2->R4, R4->R6}/ {11, 18} | NONE | NO |
| 3 | R2->R6 | {R2->R4, R4->R6}/ {11, 18} | NONE | NO |
| 4 | R2->R6 | {R2->R4, R4->R6}/ {11, 18} | NONE | NO |

SD=2: F-BM =000......01111

| BIT POSITION | NEXT-HOP | LINK PROTECTION DETOUR/BIT STRING | NODE PROTECTION BACKUP NEXT-HOP | IS LOCAL SEGMENT ? |
|---|---|---|---|---|
| 1 | R2->R6 | {R2->R4, R4->R6}/ {11, 18} | NONE | NO |
| 2 | R2->R6 | {R2->R4, R4->R6}/ {11, 18} | NONE | NO |
| 3 | R2->R6 | {R2->R4, R4->R6}/ {11, 18} | NONE | NO |
| 4 | R2->R6 | {R2->R4, R4->R6}/ {11, 18} | NONE | NO |

FIG. 12A

PSEUDOCODE 1200

```
Originate_FIB_SR_Packet (Packet, Flow_State, Proto, Dscp, Ttl)
{
   // Next few steps would look for the appropriate next-hop of the packet based on the
   // first segment in the first bit string of the flow.          ~1201
   Forwarding_Table = Get the FIB-SR Forwarding Table for
   Flow_State->BitStrings_By_SD[0]->SD // Get the bit position of the first segment, to lookup the Forwarding Table
   BitPos = Convert_to_integer(Forwarding_Table->F-BM &                 ~1202
                  Flow_State-> BitStrings_By_SD[0]->BitString);
                                                     ~1203
   Forwarding_State = Forwarding_Table[BitPos];
                                                         ~1204
   // Build the first Bit String Header. Mark S-bit as 0 for now.
   First_BitString_Header = {Flow_State->BitStrings_By_SD[0]->SD,
                             Flow_State->BitStrings_By_SD[0]->BSL, 0,
                             Flow_State->BitStrings_By_SD[0]->BitString};

// If the bit position indicates a local segment then it is not encoded in the bit string
   // header.
   if (Forwarding_State->isLocalSegment)
   {                                                                    ~1205
      First_BitStringHeader->BitString &= ~Convert_to_BitString(BitPos);
   }

// If the next-hop is operational then that's the one to forward the packet,
   // else look for FRR detour paths.
     if (Forwarding_State->NextHop is operational)
     {                                              ~1206
        NextHop = ForwardingState->NextHop;
     }
     else
     {
        // If the failed next-hop has link protection detour path which is operational then
        // fast-reroute the packet via that detour
        if (ForwardingState->LinkProtectDetour exists and is operational)
        {
           // Get the bit position of the first segment in the detour path, to lookup the
           // forwarding table.                               ~1207.1
           BitPos = Convert_to_integer(Forwarding_Table->F-BM &
                  ForwardingState->LinkProtectDetour->BitString);
```

PSEUDOCODE 1200 

```
    ForwardingState=Forwarding_Table[BitPos];  ⎯ 1207.2

NextHop = ForwardingState->NextHop;  ⎯ 1207.3

// Encode the bit string of the detour path in the first bit string, except the bit
    // position of the first segment.
    FirstBitStringHeader->BitString |=
    ForwardingState->LinkProtectDetour->BitString &    ⎯ 1207.4
    ~Convert_to_BitString(BitPos);
}                                                                    ⎯ 1207

// Else means no link protection or the link protection detour also failed. Then try
// global node protection if global MP is provided.
else if (Flow_State->Global_MP exists)
{
    Forwarding_Table = Get the FIB-SR Forwarding Table for
                      FlowState->Global_MP->SD;   ⎯ 1208.1

// Lookup the forwarding state of the detour path.
    Forwarding_State = Forwarding_Table[FlowState->Global_MP->BitPos];  ⎯ 1208.2

// If the next-hop is operational then that's the one to forward the packet,
    // else look for node protecting backup next-hop.
    if (Forwarding_State->NextHop is operational)
    {
        NextHop = ForwardingState->NextHop;  ⎯ 1208.3
    }
    else if (Forwarding_State->BackupNextHop exists and is operational)
    {
        NextHop = ForwardingState->BackupNextHop;  ⎯ 1208.4
    }
    else
    {
        // Backup is down as well. So drop the packet.
        goto Drop_Packet;  ⎯ 1208.5
    }
```
⎯ 1208

FIG. 12C

PSEUDOCODE 1200

```
    // Since using global node protection, so only one bit string will go in the
    // packet, wherein the global MP is encoded as the bit.
    BitStringHeader = {Flow_State->Global_MP->SD,              ⎤ ─ 1208.6
                       Flow_State->Global_MP->BitPos, 1,       ⎥
                       Convert_to_BitString(Flow_State->Global_MP->BitPos)};  ⎬ ─ 1208

Packet = BitStringHeader + Packet;                         ⎥ goto Send_Packet;   ─ 1208.7                               ⎦
    }
}

// If global MP is provided then push it to the packet first.  ─ 1209
if (Flow_State->Global_MP exists)
{
    Packet = {Flow_State->Global_MP->SD,      ─ 1210
    Flow_State->Global_MP->BitPos} + Packet;
}

// Now push bit String Headers for the bit strings. Set the Stack bit to 1 so that first
// header pushed (i.e., last header from the top) will have the Sbit set to 1.
Sbit = 1;

// Push the Bit String Header for each bit string in reverse order,
// except the first one, i.e., from the max index until 1. Will push the
// first one (at index 0) after pushing the rest.
for (index = Num_Elements(Flow_State->BitStrings_By_SD[]) -1;
     index > 0;
     index = index -1)
{
    // Build Bit String Header. Mark S-bit as 0.
    BitString_Header = {Flow_State->BitStrings_By_SD[index]->SD,
                        Flow_State->BitStrings_By_SD[index]->BSL, 0,
                        Flow_State->BitStrings_By_SD[index]->BitString};     ⎬ ─ 1211

// Push Bit String Header into the packet.
    Packet = BitStringHeader + Packet;

Sbit = 0;
}
```

FIG. 12D

PSEUDOCODE
1200

```
// Update the Sbit in first bit string header that was built at the beginning.
First_BitString_Header->Sbit = Sbit;

// Push the first bit string header.
Packet = First_BitString_Header + Packet;   ──1212

Send_Packet:

// Push the FIB-SR Common Header
    Packet = {Ttl, FlowState->Entropy, Dscp, Proto, This_Router->SD,   ──1213.1
    This_Router->BitPos} + Packet.

// Push the layer-2 header for the next-hop onto the packet.   ──1213.2
    Packet = {Layer_2_Header of the NextHop} + Packet                         ── 1213

// Dispatch the packet to next-hop.
    Send(Packet, NextHop);   ──1213.3

Drop_Packet:
    Return;
}
```

FIG. 13A

PSEUDOCODE 1300 

```
Process_FIB_SR_Packet(Packet)
{
    // All further processing is based on the first BitString Header in FIB-SR Header.
    Forwarding_Table = Get FIB-SR Forwarding Table for          ⟵1301
                    Packet->BitStringHeaders[0]->SD;

// Lookup the bit position in the first bit string header, to lookup the Forwarding_Table
    BitPos = Convert_to_integer(Forwarding_Table->F-BM &        ⟵1302
            Packet->BitStringHeaders[0]->BitString);

Forwarding_State = Forwarding_Table[BitPos];   ⟵1303

// If the bit position indicates a local segment then reset the bit in the bit string.
    if (Forwarding_State->isLocalSegment)
    {
        Packet->BitStringHeaders[0]->BitString &= ~BitString_of(BitPos);  ⟵1304
    }

// If the next-hop is operational then that's the one to forward the packet,
    // else look for FRR detour paths.
    if (Forwarding_State->NextHop is operational)
    {
        NextHop = ForwardingState->NextHop;  ⟵1305
    }
    else
    {
        // If the failed next-hop has link protection detour path which is operational then
        // fast-reroute the packet via that detour
        if (ForwardingState->LinkProtectDetour exists and is operational)
        {
            // Get the bit position of the first segment in the detour path, to lookup the
            // forwarding table.
            BitPos = Convert_to_integer(Forwarding_Table->F-BM &    ⟵1306.1
                    ForwardingState->LinkProtectDetour->BitString);

Forwarding_State = Forwarding_Table[BitPos];  ⟵1306.2

NextHop = ForwardingState->NextHop;  ⟵1306.3
```

⎱ 1306

FIG. 13B    PSEUDOCODE 1300

```
    // Encode the bit string of the detour path in the first bit string,
    // except the bit position of the first segment.
    Packet->BitStringHeaders[0]->BitString |=
      ForwardingState->LinkProtectDetour->BitString    //1306.4
      & ~Convert_to_BitString(BitPos);
}
// Else means no link protection or the link protection detour also failed.
// Then try global node protection if global MP is provided.
else if (Packet->Global_MP exists)
{
    Forwarding_Table = Get the FIB-SR Forwarding Table for    //1307.1
                Packet->Global_MP->SD;

// Lookup the forwarding state of the global MP.
    Forwarding_State = Forwarding_Table[Packet->Global_MP->BitPos];  //1307.2

// If the next-hop is operational then that's the one to which to forward
    // the packet, else look for node protecting backup next-hop.
    if (Forwarding_State->NextHop is operational)
    {
        NextHop = ForwardingState->NextHop;    //1307.3
    }
    else if (Forwarding_State->BackupNextHop exists and is operational)
    {
        NextHop = ForwardingState->BackupNextHop;    //1307.4
    }
    else
    {
        // Backup is down as well. So, drop the packet.    //1307.5
        goto Drop_Packet;
    }

// Since using global node protection, so one bit string will go in the packet,
    // wherein the global MP is encoded as the bit.
    Remove_All_BitStringHeaders(Packet->BitStringHeaders[]);    //1307.6

BitStringHeader = {Packet->Global_MP->SD,
            Packet->Global_MP->BitPos, 1,    //1307.7
            Convert_to_BitString(Packet->Global_MP->BitPos)};

Packet = BitStringHeader + Packet;    //1307.8
```

PSEUDOCODE 1300 

```
        // Remove the global MP from packet now.           ⎫
        Remove_Global_MP(Packet->Global_MP);  ⎯1307.9      ⎪
                                                            ⎬ 1307
        goto Send_Packet;                                  ⎪
      }                                                    ⎭
    }

// If the first bit string is empty then remove the Bit String Header.    ⎫
    if (Packet->BitStringHeaders[0]->BitString == 0)                          ⎪
    {                                                                         ⎪
      Remove_BitStringHeader(Packet->FIB_SR_Header->BitStringHeaders[0]);     ⎪
                                                                              ⎪
      // If no remaining bit strings then remove the FIB-SR header completely.⎪
      // The packet will go out as non-FIB-SR packet.                         ⎪
      if (Num_Elements(Packet->BitStringHeaders[]) == 0)                      ⎬ 1308
      {                                                                       ⎪
         Remove_FIB_SR_Common_Header(Packet->FIB_SR_Common_Header);           ⎪
                                                                              ⎪
         if (Packet->Global_MP exists)                                        ⎪
         {                                                                    ⎪
            Remove_Global_MP(Packet->Global_MP);                              ⎪
         }                                                                    ⎪
      }                                                                       ⎪
    }                                                                         ⎭

Send_Packet:

// Push the layer-2 header for the next-hop onto the packet.    ⎫
    Packet = {Layer_2_Header of the NextHop} + Packet ⎯1309.1        ⎪
                                                                     ⎬ 1309
    // Dispatch the packet to next-hop.  ⎯1309.2                     ⎪
    Send(Packet, NextHop);                                           ⎭

Drop_Packet:
    Return;
}
```

FLEXIBLE PATH ENCODING IN PACKET SWITCHED NETWORKS

TECHNICAL FIELD

Various example embodiments relate generally to communication systems and, more particularly but not exclusively, to supporting packet forwarding in packet switched networks.

BACKGROUND

In many communication networks, various communications technologies may be used to support communications.

SUMMARY

In at least some example embodiments, an apparatus includes at least one processor and at least one memory including program code, wherein the at least one memory and the program code are configured to, with the at least one processor, cause the apparatus to at least handle a packet to be routed over a path through a network including a set of segments, wherein the packet includes a header and a payload, wherein the header includes a bit string including a set of bit positions corresponding to respective ones of at least a portion of the segments of the network, wherein the bit positions of the bit string are set in a manner for encoding the path within the bit string. In at least some example embodiments, the packet includes a source routed packet. In at least some example embodiments, the packet includes a segment routed packet. In at least some example embodiments, the set of segments of the network includes at least one of one or more single-hop segments or one or more multi-hop segments. In at least some example embodiments, the set of segments of the network includes a set of prefix segments and a set of adjacency segments. In at least some example embodiments, a number of bit positions included in the bit string is based on ones of the segments of the network that form the path. In at least some example embodiments, the number of bit positions included in the bit string is equal to a highest bit position associated with the ones of the segments of the network that form the path. In at least some example embodiments, to handle the packet, the at least one memory and the program code are configured to, with the at least one processor, cause the apparatus to at least receive, by a router, the payload, identify, by the router, ones of the segments of the network of which the path is composed, generate, by the router based on the ones of the segments of the network of which the path is composed, the header, and form, by the router based on association of the header with the payload, the packet. In at least some example embodiments, to handle the packet, the at least one memory and the program code are configured to, with the at least one processor, cause the apparatus to at least receive, by a router, the packet, identify, by the router, one of the bit positions of the bit string for which the router has forwarding state, and determine, by the router based on a forwarding state, forwarding of the packet. In at least some example embodiments, to handle the packet, the at least one memory and the program code are configured to, with the at least one processor, cause the apparatus to at least forward, by the router based on a determination based on the forwarding state that a next-hop of the path is available, the packet. In at least some example embodiments, the at least one memory and the program code are configured to, with the at least one processor, cause the apparatus to at least update, by the router based on a determination that the one of the bit positions of the bit string for which the router has forwarding state represents a local segment of the router, the packet by resetting the one of the bit positions of the bit string for which the router has forwarding state. In at least some example embodiments, the at least one memory and the program code are configured to, with the at least one processor, cause the apparatus to at least reduce a length of the bit string, by removing one or more of the bit positions of the bit string, based on a determination that a most significant bit of the bit string is not set after the resetting of the one of the bit positions of the bit string for which the router has forwarding state. In at least some example embodiments, to handle the packet, the at least one memory and the program code are configured to, with the at least one processor, cause the apparatus to at least determine, by the router based on a determination based on the forwarding state that a next-hop of the path is unavailable, a protection path for the packet and forward, by the router via the protection path, the packet. In at least some example embodiments, the protection path includes one or more protection hops and the at least one memory and the program code are configured to, with the at least one processor, cause the apparatus to at least update, by the router prior to forwarding the packet via the protection path, the bit string to set at least one bit position corresponding to at least one of the protection hops. In at least some example embodiments, the update of the bit string includes increasing a length of the bit string to include one or more additional bit positions. In at least some example embodiments, to handle the packet, the at least one memory and the program code are configured to, with the at least one processor, cause the apparatus to at least receive, by a router, the packet, determine, by the router, that the router is an egress point of the path for the packet, recover, by the router from the packet by removing the bit string from the header of the packet based on a determination that none of the bit positions in the bit string are set, the payload, and forward, by the router based on a local forwarding state of the router, the payload. In at least some example embodiments, for at least one of the bit positions of the bit string, the respective bit position has associated therewith at least one of a link protection detour path or a node protection detour path. In at least some example embodiments, for at least one of the bit positions of the bit string, the respective bit position has associated therewith a link protection detour path and a node protection detour path. In at least some example embodiments, to handle the packet, the at least one memory and the program code are configured to, with the at least one processor, cause the apparatus to at least receive, by a router, the packet, determine, for a failure associated with forwarding of the packet from the router, whether the failure is a link failure or a node failure, and initiate a reroute of the packet based on whether the failure is a link failure or a node failure.

In at least some example embodiments, a non-transitory computer-readable medium includes instructions configured to cause an apparatus to at least handle a packet to be routed over a path through a network including a set of segments, wherein the packet includes a header and a payload, wherein the header includes a bit string including a set of bit positions corresponding to respective ones of at least a portion of the segments of the network, wherein the bit positions of the bit string are set in a manner for encoding the path within the bit string. In at least some example embodiments, the packet includes a source routed packet. In at least some example embodiments, the packet includes a segment routed packet. In at least some example embodiments, the set of segments of the network includes at least one of one or more single-hop segments or one or more multi-hop segments. In at least some example embodiments, the set of segments of the network includes a set of prefix segments and a set of adjacency segments. In at least some example embodiments, a number of bit positions included in the bit string is based on ones of the segments of the network that form the path. In at least some example embodiments, the number of bit positions included in the bit string is equal to a highest bit position associated with the ones of the segments of the network that form the path. In at least some example embodiments, to handle the packet, the non-transitory computer-readable medium includes instructions configured to cause the apparatus to at least receive, by a router, the payload, identify, by the router, ones of the segments of the network of which the path is composed, generate, by the router based on the ones of the segments of the network of which the path is composed, the header, and form, by the router based on association of the header with the payload, the packet. In at least some example embodiments, to handle the packet, the non-transitory computer-readable medium includes instructions configured to cause the apparatus to at least receive, by a router, the packet, identify, by the router, one of the bit positions of the bit string for which the router has forwarding state, and determine, by the router based on a forwarding state, forwarding of the packet. In at least some example embodiments, to handle the packet, the non-transitory computer-readable medium includes instructions configured to cause the apparatus to at least forward, by the router based on a determination based on the forwarding state that a next-hop of the path is available, the packet. In at least some example embodiments, the non-transitory computer-readable medium includes instructions configured to cause the apparatus to at least update, by the router based on a determination that the one of the bit positions of the bit string for which the router has forwarding state represents a local segment of the router, the packet by resetting the one of the bit positions of the bit string for which the router has forwarding state. In at least some example embodiments, the non-transitory computer-readable medium includes instructions configured to cause the apparatus to at least reduce a length of the bit string, by removing one or more of the bit positions of the bit string, based on a determination that a most significant bit of the bit string is not set after the resetting of the one of the bit positions of the bit string for which the router has forwarding state. In at least some example embodiments, to handle the packet, the non-transitory computer-readable medium includes instructions configured to cause the apparatus to at least determine, by the router based on a determination based on the forwarding state that a next-hop of the path is unavailable, a protection path for the packet and forward, by the router via the protection path, the packet. In at least some example embodiments, the protection path includes one or more protection hops and the non-transitory computer-readable medium includes instructions configured to cause the apparatus to at least update, by the router prior to forwarding the packet via the protection path, the bit string to set at least one bit position corresponding to at least one of the protection hops. In at least some example embodiments, the update of the bit string includes increasing a length of the bit string to include one or more additional bit positions. In at least some example embodiments, to handle the packet, the non-transitory computer-readable medium includes instructions configured to cause the apparatus to at least receive, by a router, the packet, determine, by the router, that the router is an egress point of the path for the packet, recover, by the router from the packet by removing the bit string from the header of the packet based on a determination that none of the bit positions in the bit string are set, the payload, and forward, by the router based on a local forwarding state of the router, the payload. In at least some example embodiments, for at least one of the bit positions of the bit string, the respective bit position has associated therewith at least one of a link protection detour path or a node protection detour path. In at least some example embodiments, for at least one of the bit positions of the bit string, the respective bit position has associated therewith a link protection detour path and a node protection detour path. In at least some example embodiments, to handle the packet, the non-transitory computer-readable medium includes instructions configured to cause the apparatus to at least receive, by a router, the packet, determine, for a failure associated with forwarding of the packet from the router, whether the failure is a link failure or a node failure, and initiate a reroute of the packet based on whether the failure is a link failure or a node failure.

In at least some example embodiments, a method includes handling a packet to be routed over a path through a network including a set of segments, wherein the packet includes a header and a payload, wherein the header includes a bit string including a set of bit positions corresponding to respective ones of at least a portion of the segments of the network, wherein the bit positions of the bit string are set in a manner for encoding the path within the bit string. In at least some example embodiments, the packet includes a source routed packet. In at least some example embodiments, the packet includes a segment routed packet. In at least some example embodiments, the set of segments of the network includes at least one of one or more single-hop segments or one or more multi-hop segments. In at least some example embodiments, the set of segments of the network includes a set of prefix segments and a set of adjacency segments. In at least some example embodiments, a number of bit positions included in the bit string is based on ones of the segments of the network that form the path. In at least some example embodiments, the number of bit positions included in the bit string is equal to a highest bit position associated with the ones of the segments of the network that form the path. In at least some example embodiments, handling the packet includes receiving, by a router, the payload, identifying, by the router, ones of the segments of the network of which the path is composed, generating, by the router based on the ones of the segments of the network of which the path is composed, the header, and forming, by the router based on association of the header with the payload, the packet. In at least some example embodiments, handling the packet includes receiving, by a router, the packet, identifying, by the router, one of the bit positions of the bit string for which the router has forwarding state, and determining, by the router based on a forwarding state, forwarding of the packet. In at least some example embodiments, handling the packet includes forwarding, by the router based on a determination based on the forwarding state that a next-hop of the path is available, the packet. In at least some example embodiments, the method includes updating, by the router based on a determination that the one of the bit positions of the bit string for which the router has forwarding state represents a local segment of the router, the packet by resetting the one of the bit positions of the bit string for which the router has forwarding state. In at least some example embodiments, the method includes reducing a length of the bit string, by removing one or more of the bit positions of the bit string, based on a determination that a most significant bit of the bit string is not set after the resetting of the one of the bit positions of the bit string for which the router has forwarding state. In at least some example embodiments, handling the packet includes determining, by the router based on a determination based on the forwarding state that a next-hop of the path is unavailable, a protection path for the packet and forwarding, by the router via the protection path, the packet. In at least some example embodiments, the protection path includes one or more protection hops and the method includes updating, by the router prior to forwarding the packet via the protection path, the bit string to set at least one bit position corresponding to at least one of the protection hops. In at least some example embodiments, the update of the bit string includes increasing a length of the bit string to include one or more additional bit positions. In at least some example embodiments, handling the packet includes receiving, by a router, the packet, determining, by the router, that the router is an egress point of the path for the packet, recovering, by the router from the packet by removing the bit string from the header of the packet based on a determination that none of the bit positions in the bit string are set, the payload, and forwarding, by the router based on a local forwarding state of the router, the payload. In at least some example embodiments, for at least one of the bit positions of the bit string, the respective bit position has associated therewith at least one of a link protection detour path or a node protection detour path. In at least some example embodiments, for at least one of the bit positions of the bit string, the respective bit position has associated therewith a link protection detour path and a node protection detour path. In at least some example embodiments, handling the packet includes receiving, by a router, the packet, determining, for a failure associated with forwarding of the packet from the router, whether the failure is a link failure or a node failure, and initiating a reroute of the packet based on whether the failure is a link failure or a node failure.

In at least some example embodiments, an apparatus includes means for handling a packet to be routed over a path through a network including a set of segments, wherein the packet includes a header and a payload, wherein the header includes a bit string including a set of bit positions corresponding to respective ones of at least a portion of the segments of the network, wherein the bit positions of the bit string are set in a manner for encoding the path within the bit string. In at least some example embodiments, the packet includes a source routed packet. In at least some example embodiments, the packet includes a segment routed packet. In at least some example embodiments, the set of segments of the network includes at least one of one or more single-hop segments or one or more multi-hop segments. In at least some example embodiments, the set of segments of the network includes a set of prefix segments and a set of adjacency segments. In at least some example embodiments, a number of bit positions included in the bit string is based on ones of the segments of the network that form the path. In at least some example embodiments, the number of bit positions included in the bit string is equal to a highest bit position associated with the ones of the segments of the network that form the path. In at least some example embodiments, the means for handling the packet includes means for receiving, by a router, the payload, means for identifying, by the router, ones of the segments of the network of which the path is composed, means for generating, by the router based on the ones of the segments of the network of which the path is composed, the header, and means for forming, by the router based on association of the header with the payload, the packet. In at least some example embodiments, the means for handling the packet includes means for receiving, by a router, the packet, means for identifying, by the router, one of the bit positions of the bit string for which the router has forwarding state, and means for determining, by the router based on a forwarding state, forwarding of the packet. In at least some example embodiments, the means for handling the packet includes means for forwarding, by the router based on a determination based on the forwarding state that a next-hop of the path is available, the packet. In at least some example embodiments, the apparatus includes means for updating, by the router based on a determination that the one of the bit positions of the bit string for which the router has forwarding state represents a local segment of the router, the packet by resetting the one of the bit positions of the bit string for which the router has forwarding state. In at least some example embodiments, the apparatus includes means for reducing a length of the bit string, by removing one or more of the bit positions of the bit string, based on a determination that a most significant bit of the bit string is not set after the resetting of the one of the bit positions of the bit string for which the router has forwarding state. In at least some example embodiments, the means for handling the packet includes means for determining, by the router based on a determination based on the forwarding state that a next-hop of the path is unavailable, a protection path for the packet and means for forwarding, by the router via the protection path, the packet. In at least some example embodiments, the protection path includes one or more protection hops and the apparatus includes means for updating, by the router prior to forwarding the packet via the protection path, the bit string to set at least one bit position corresponding to at least one of the protection hops. In at least some example embodiments, the update of the bit string includes increasing a length of the bit string to include one or more additional bit positions. In at least some example embodiments, the means for handling the packet includes means for receiving, by a router, the packet, means for determining, by the router, that the router is an egress point of the path for the packet, means for recovering, by the router from the packet by removing the bit string from the header of the packet based on a determination that none of the bit positions in the bit string are set, the payload, and means for forwarding, by the router based on a local forwarding state of the router, the payload. In at least some example embodiments, for at least one of the bit positions of the bit string, the respective bit position has associated therewith at least one of a link protection detour path or a node protection detour path. In at least some example embodiments, for at least one of the bit positions of the bit string, the respective bit position has associated therewith a link protection detour path and a node protection detour path. In at least some example embodiments, the means for handling the packet includes means for receiving, by a router, the packet, means for determining, for a failure associated with forwarding of the packet from the router, whether the failure is a link failure or a node failure, and means for initiating a reroute of the packet based on whether the failure is a link failure or a node failure.

In at least some example embodiments, an apparatus includes at least one processor and at least one memory including program code, wherein the at least one memory and the program code are configured to, with the at least one processor, cause the apparatus to at least handle a source routed packet to be routed over a path through a network including a set of elements, wherein the source routed packet includes a header and a payload, wherein the header includes a bit string including a set of bit positions corresponding to respective ones of at least a portion of the elements of the network, wherein the bit positions of the bit string are set in a manner for encoding the path within the bit string, wherein a number of bit positions in the bit string is based on the ones of the elements of the network that form the path. In at least some example embodiments, a non-transitory computer-readable medium includes instructions configured to cause an apparatus to at least handle a source routed packet to be routed over a path through a network including a set of elements, wherein the source routed packet includes a header and a payload, wherein the header includes a bit string including a set of bit positions corresponding to respective ones of at least a portion of the elements of the network, wherein the bit positions of the bit string are set in a manner for encoding the path within the bit string, wherein a number of bit positions in the bit string is based on the ones of the elements of the network that form the path. In at least some example embodiments, a method includes handling a source routed packet to be routed over a path through a network including a set of elements, wherein the source routed packet includes a header and a payload, wherein the header includes a bit string including a set of bit positions corresponding to respective ones of at least a portion of the elements of the network, wherein the bit positions of the bit string are set in a manner for encoding the path within the bit string, wherein a number of bit positions in the bit string is based on the ones of the elements of the network that form the path. In at least some example embodiments, an apparatus includes means for handling a source routed packet to be routed over a path through a network including a set of elements, wherein the source routed packet includes a header and a payload, wherein the header includes a bit string including a set of bit positions corresponding to respective ones of at least a portion of the elements of the network, wherein the bit positions of the bit string are set in a manner for encoding the path within the bit string, wherein a number of bit positions in the bit string is based on the ones of the elements of the network that form the path.

BRIEF DESCRIPTION OF THE DRAWINGS

The teachings herein can be readily understood by considering the following detailed description in conjunction with the accompanying drawings, in which:

FIG. 2 depicts an example of allocation of bit positions for segments of the communication system of FIG. 1 for supporting packet forwarding based on flexible path encoding;

FIG. 3 depicts an example of a forwarding table of a router of the communication system of FIG. 1 for supporting packet forwarding based on flexible path encoding;

FIG. 4 depicts an example of an expanded version of the forwarding table of FIG. 3 that includes link protecting detour paths protecting against failures of immediate next-hops of the router;

FIG. 5 depicts an example of an expanded version of the forwarding table of FIG. 4 that includes node protecting detour paths protecting against failures of immediate neighbors of the router;

FIG. 7 depicts an example of allocation of bit positions for segments of the domains of the multi-domain packet switched network for FIG. 6 for supporting packet forwarding based on flexible path encoding;

FIGS. 8A-8B depict examples of forwarding tables of a router of the multi-domain packet switched network of FIG. 6 for supporting packet forwarding based on flexible path encoding;

FIGS. 12A-12D depict an example embodiment of pseudocode for originating a source routed packet configured for packet forwarding based on flexible path encoding;

FIGS. 13A-13C depict an example embodiment of pseudocode for processing a source routed packet configured for packet forwarding based on flexible path encoding;

To facilitate understanding, identical reference numerals have been used, where possible, to designate identical elements that are common to the figures.

DETAILED DESCRIPTION

Figure 1:
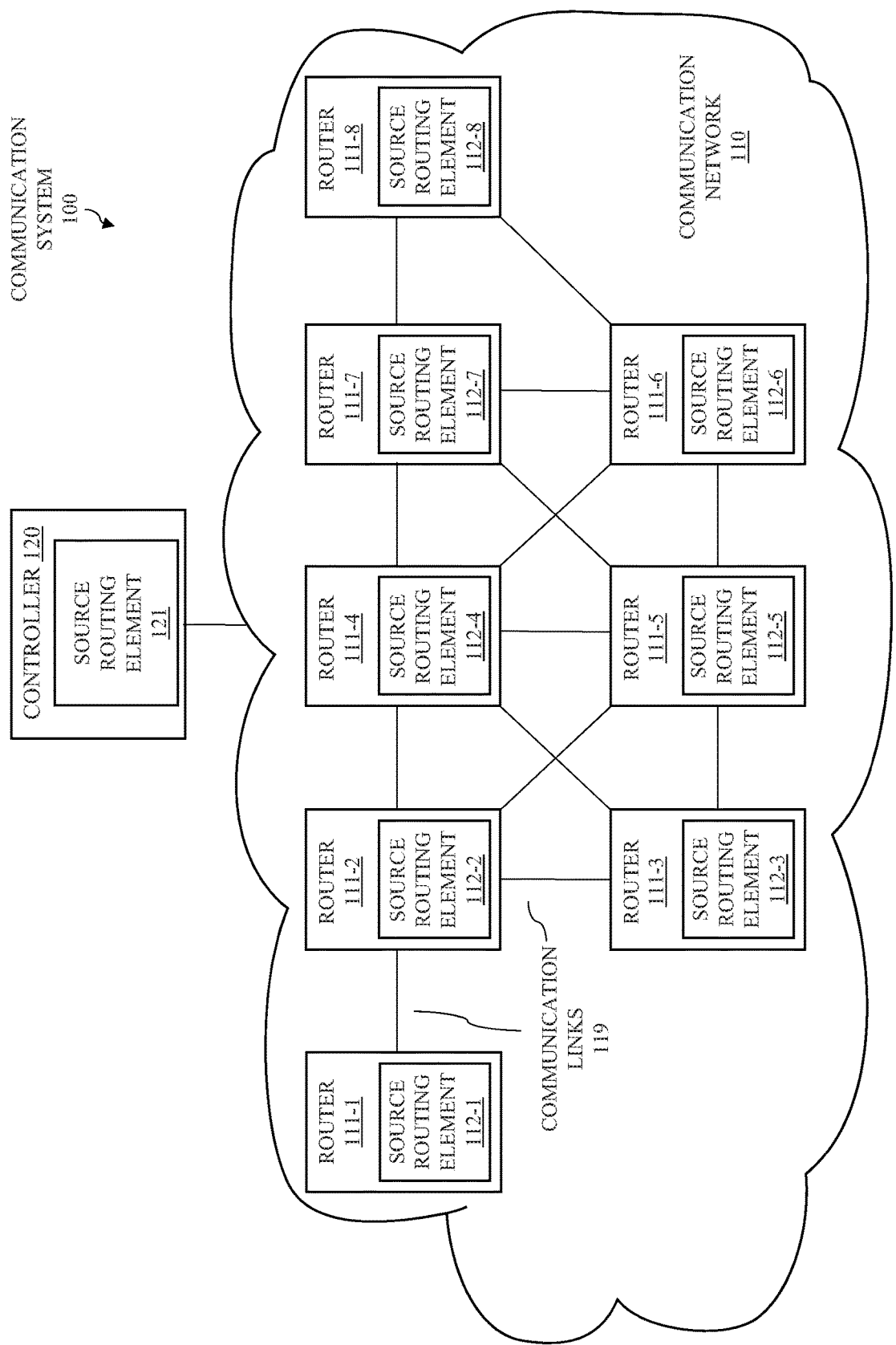
FIG. 1 depicts an example embodiment of a communication system configured to support packet forwarding in packet switched networks based on flexible path encoding.

Various example embodiments for supporting packet forwarding in communication networks are presented. Various example embodiments for supporting packet forwarding in communication networks may be configured to support forwarding of various types of packets (e.g., source routed packets, segment routed packets, or the like) in packet switched networks based on flexible path encoding. Various example embodiments for supporting packet forwarding in communication networks may be configured to support forwarding of source routed packets in packet switched networks based on flexible path encoding. Various example embodiments for supporting forwarding of source routed packets based on flexible path encoding may be configured to support forwarding of source routed packets based on various types of source routing, such as segment routing (SR), SR-Traffic Engineering (SR-TE), or the like. Various example embodiments for supporting forwarding of segment routed packets based on flexible path encoding may be configured to support forwarding of segment routed packets based on SR-TE which may be provided using various types of data planes (e.g., Multiprotocol Label Switching (MPLS), Internet Protocol version 4 (IPv4), Internet Protocol version 6 (IPv6), or the like, as well as various combinations thereof). Various example embodiments for supporting routing of source routed packets based on flexible path encoding may be configured to support handling of a segment routed packet to be routed over a path through a network including a set of segments, wherein the segment routed packet includes a header and a payload, wherein the header includes a bit string including a set of bit positions corresponding to respective ones of at least a portion of the segments of the network, wherein the bit positions of the bit string are set in a manner for encoding the path within the bit string. Various example embodiments for supporting forwarding of segment routed packets based on flexible path encoding may be configured to support encoding of the explicit path for a segment routed packet into the segment routed packet as a variable sized bit string having bit positions corresponding to segments of the explicit path where the bit string has a variable length that is determined by the highest bit position that is set in the bit string (e.g., in a network having 100 segments, if the explicit path includes 5 segments corresponding to bit positions 3, 7, 10, 1, and 15, respectively, then the bit string is 15 bits long and the bit positions of the bit string are set as follows 100001001000101). Various example embodiments for supporting forwarding of segment routed packets based on flexible path encoding may be configured to support encoding of the explicit path for a segment routed packet into the segment routed packet as a variable sized bit string where the ingress router sends the segment packet with the bit string and each forwarding router along the explicit path forwards the segment routed packet along the explicit path based on the bit string (e.g., evaluates the bit string in the segment routed packet to find the only bit for which it has a forwarding state, resets that bit in the bit string if the bit represents a local segment of the router (i.e., the end of the segment has been reached), and forwards the segment routed packet to the next-hop as per the forwarding state of that bit) until the segment routed packet reaches the egress node of the explicit path (at which point the bit string is empty, which means that all segments in the explicit path have been traversed by the segment routed packet and the segment routed packet has reached the egress router of the explicit path). Various example embodiments for supporting forwarding of segment routed packets based on flexible path encoding may be configured to support forwarding of segment routed packets based on flexible path encoding in single domain networks (e.g., using a single variable length bit string for encoding the segments of the explicit path within the single domain) and in multiple domain networks (e.g., using a chain of multiple variable length bit strings encoding multiple sets of segments traversed in the multiple domains, respectively). Various example embodiments for supporting forwarding of source routed packets based on flexible path encoding, in this manner, may significantly reduce the overhead of encoding the explicit path within the segment routed packet (e.g., since a single bit offers a shortest form of representation of a segment identifier of a segment for source routing and since the length of the variable sized bit string is equal to the highest bit position encoded in the variable sized bit string even though other bit positions may be represented in the network), may significantly reduce the overhead of forwarding lookups along the explicit path (e.g., as indicated above, the forwarding operation can be performed with a single lookup (i.e., formally O(1) lookup)), and may provide various other advantages or potential advantages. It will be appreciated that these and various other example embodiments and advantages or potential advantages of supporting forwarding of source routed packets in source routed packet switched networks based on flexible path encoding, including forwarding of segment routed packets in SR-based packet switched networks, may be further understood by way of reference to the various figures, which are discussed further below.

FIG. 1 depicts an example embodiment of a communication system configured to support packet forwarding in packet switched networks based on flexible path encoding.

The communication system 100 includes a communication network 110 and a controller 120. The communication network 110 is a packet-switched network including a set of routers 111-1-111-8 (collectively, routers 111, which are also referred to herein using the notation Rx) and a set of communication links 119 via which the routers 111 are communicatively connected. The communication network 110 is configured to support various data plane functions and various control plane functions for supporting communication of traffic based on source routing. The controller 120 is configured to provide control functions for the communication network 110 (e.g., computing and installing routes within communication network 110, performing monitoring and rerouting functions for communication network 110, or the like, as well as various combinations thereof). The communication system 100 is configured to support various example embodiments for supporting packet forwarding in packet switched networks based on flexible path encoding. The communication system 100 is configured to support various example embodiments for supporting forwarding of source routed packets (e.g., based on SR, SR-TE, or the like) based on flexible path encoding. Various example embodiments for supporting packet forwarding within the communication network 110 based on flexible path encoding may be further understood by first considering various aspects of packet switched networks.

In general, many packet-switched networks, such as communication network 110, are built on mesh topologies in which there are multiple paths available to reach a given destination. The links in the mesh topology are point-to-point links between routers (illustratively, communication links 119 between routers 111). In general, a path to a destination may go through any number of routers 111, and the path may change at any time due to various conditions (e.g., traffic problems, failed links, failed nodes, or the like). In this type of environment, there are generally at least two possible packet-routing methods available: hop-by-hop destination-based routing and source routing.

In hop-by-hop destination-based routing, a packet has a source address (SA) and a destination address (DA) and, at each router along the route, the router checks the DA and makes a routing decision as to how to forward the packet based on the DA. Thus, decisions are made on a hop-by-hop basis in the network until the packet reaches its destination. In this mode, each router needs to maintain forwarding information for each possible packet destination. In other words, this scheme is similar to getting directions along the way.

In source routing, also called explicit path addressing, a head-end router may partially or completely specify the route that the packet takes through the network. The head-end router discovers an explicit path for a packet flow through the network (e.g., locally or based on interaction with a controller) in advance of sending packets of the packet flow. The explicit path is "encoded" into the packet and transit routers forward the packet based on that explicit path. In general, as discussed further below, source routing may use a loose source route, a strict source route, or a combination thereof.

In general, source routing, as compared with hop-by-hop destination-based routing, reduces the states needed in transit nodes in order for the transit nodes to forward a packet, since each transit node typically maintains forwarding information to next-hop nodes (rather than maintaining forwarding information to each possible packet destination, as in hop-by-hop destination-based routing). A generic method of source routing is explained below with respect to FIG. 1.

In FIG. 1, R1 (the head-end router) decides to send a packet along the path R1-R2-R4-R7-R8. In this example, assume that R1, R2, R3 . . . , R8 are loopback addresses assigned as node/router identifiers. For example, in the IPv4 addressing scheme, R8 may be something like 1.1.1.1. So R1 encodes the explicit path with node identifiers as {R4, R7, R8} into the packet and sends the packet to R2. When R2 receives the packet, it reads and pops the first hop in the explicit path, which is R4, and then forwards the packet to R4 with the explicit path in the packet as {R7, R8}. When R4 receives the packet, it reads and pops the first hop in the explicit path, which is R7, and forwards the packet to R7 with the explicit path {R8}. When R7 receives the packet, it reads and pops the first hop, which is R8, and forwards the packet to R8 without any explicit path. The packet may then be forwarded by destination based routing at R8 and onwards toward the ultimate destination for the packet.

As indicated above, source routing may use a loose source route, in which an intermediate router can choose among multiple paths to reach a specified next hop. For example, if R2 finds that the "optimal" path to R4 is via R2-R3-R4, instead of R3-R4 specified in the packet, then it will not pop R4 from the explicit path and would forward the packet to R3 with the explicit path {R4, R7, R8}. When R3 receives the packet and finds the first hop in the path as R4, it pops R4 since R4 is the immediate next-hop for the packet and sends the packet to R4 with the explicit path {R7, R8}. In other words, when an explicit path includes one or more node identifiers then it may be considered a loose source route since a transit router, for a given node, can choose one among the available paths to reach the specified node (which is a loopback address of the node).

As indicated above, source routing may use a strict source route, in which the head-end router specifies the exact set of links to be taken by the packet. For example, R1 encodes a set of next-hop identifiers such as {R2->R4, R4->R7, R7->R8} to specify the path to be taken by the packet. A next-hop identifier can be represented by the next-hop address on a link. For example, R2->R4 can be encoded as the IP address on R2-R4 link at the R4 end (conversely, R4->R2 means the IP address on R2-R4 link at the R2 end). Using the IPv4 addressing scheme, it is possible to encode something like R2->R4=10.10.10.2 and R4->R2=10.10.10.1, where the R2-R4 link is assigned the subnet 10.10.10.1/30. It is noted that use of a strict source route may be preferable when a packet belonging to a service or application needs to meet strict QoS requirements or SLAs and, thus, needs to follow a strict path with links satisfying the QoS requirements or SLAs.

It is noted that source routing may use a combination of strict source routes and loose source routes. For example, R1 can specify a mix of strict and loose hops such as {R2->R4, R8}. Here, the packet must traverse the R2->R4 next-hop to reach R4, but R4 may choose one of the available paths between R4 and R8.

A variant of strict source routing with constraints is called constraint-based source routing (CBSR), which generally works as follows. The network includes network elements (e.g., nodes and links) that are arranged in a topology. Various Traffic Engineering (TE) parameters are assigned into the network elements. For example, the TE parameters of a network element may describe characteristics such as cost, delay, throughput, available bandwidth, packet loss, or the like, as well as various combinations thereof. The topology and TE parameters of the network elements are learned by a path computation element (PCE) and are maintained in a centralized traffic engineering (TE) database (TEDB) hosted by the PCE. For example, the PCE may be hosted as an external agent such as an SDN controller, a server, or the like. The PCE can learn the topology and TE parameters by listening to link-state advertisements (LSAs) from one or more Interior Gateway Protocols (IGPs) (e.g., Intermediate System to Intermediate System (IS-IS), Open Shortest Path First (OSPF), OSPF version 3 (OSPFv3), or the like) running among the routers, by using a Border Gateway Protocol (BGP) (e.g., BGP-Link State (BGP-LS), e.g., as defined in RFC 7752, or the like), by using a push/pull mechanism to gather such information from the routers, or the like, as well as various combinations thereof. The head-end router classifies packets into flows based on an application or a service, where each flow may be associated with a specific QoS requirement or SLA. The head-end router sends a request to the PCE for the PCE to compute an explicit path (typically the optimal path) that meets specified QoS requirements or SLA. The PCE typically computes such a path by running a Constraint Shortest Path First (CSPF) process based on the TEDB. Once a path is allocated, the PCE updates the dynamic TE state (e.g., residual bandwidth) of the network elements along that path into the TEDB to reflect that TE resources allocated to the path have been reserved. The head-end router sends all packets belonging to a flow over the explicit path that meets the QoS requirement/SLA of the flow. The explicit path is encoded into the packet. Thus, it is possible that packets of different flows to the same destination follow diverse paths. It is noted that, since per flow states are maintained at the head-end router, and the transit routers are agnostic of a flow (including the associated QoS requirement/SLA of the flow), this results in significant reduction of cost and complexity at the transit routers.

Source routing techniques may be used in conjunction with various different communication protocols. For example, as discussed further below, source routing techniques may be used in conjunction with MPLS (MPLS-based source routing), IPv4 (IPv4 source routing), IPv6 (IPv6 source routing), or the like, as well as various combinations thereof.

Segment Routing (SR) has been proposed as an innovative technique of source routing to provide traffic engineering (TE) by simplifying control plane operations. For example, this has been proposed in RFC 8402. SR relies on the source routing paradigm and can be deployed in packet switched networks supporting MPLS or IPv6. In SR, the loopback address of a router is referred to as a "prefix segment" and the next-hop adjacency between two routers is referred to as an "adjacency segment". Each segment is assigned a Segment Identifier (SID), which is encoded into an explicit path to identify the segment. SR using an MPLS dataplane is described in the "Segment Routing with MPLS data plane" document (see, e.g., https://tools.ietforg/html/draft-ietf-spring-segment-routing-mpls-18) and SR using an IPv6 dataplane is described in the "IPv6 Segment Routing Header (SRH)" document (see, e.g., https://tools.ietforg/html/draft-ietf-6man-segment-routing-header-15). It is noted that there is no explicit specification for SR using an IPv4 dataplane, since SR uses the IPv4 source routing described in the base IPv4 specification (RFC 791).

In SR using an MPLS dataplane, packet flows are enforced through a specific path by applying, at the ingress/head-end node, a specifically designed stack of segment identifiers (SIDs) fully compatible with the MPLS data plane. The stack of SIDs is referred to as a segment list and corresponds to the stack of labels in the MPLS architecture. The ingress/head-end router sends a packet with the list of SIDs (stack of labels) where each SID indicates a next-hop, or router, to be traversed by the packet. Only the top SID in the list is processed during packet forwarding by transit nodes. Each packet is forwarded along the shortest path toward the network element represented by the top SID. A prefix-SID represents a prefix segment. For instance, a prefix-SID can represent an ECMP-aware shortest-path to an Interior Gateway Protocol prefix (i.e., IGP-Prefix) which identifies a specific router (i.e., IGP-Node Segment). An adjacency-SID represents a hop over a specific adjacency between two nodes in the IGP (i.e., IGP-Adjacency Segment). A prefix segment is typically a multi-hop path while an Adjacency Segment, in most cases, is a one-hop path. Unlike traditional MPLS networks, SR maintains per-flow state only at the ingress node, where the segment list is applied. As such, no signaling protocol (e.g., Resource Reservation Protocol with traffic engineering extensions-RSVP-TE) is required to populate the forwarding table of transit nodes. In this way, a simplified control plane is employed by just relying on the IGP that is properly extended to advertise SIDs as additional attributes of LSAs and, further, scalability of transit nodes is greatly improved since MPLS Label Switch Path (LSP) state information is not required.

In SR using an IPv4 dataplane, as in SR using an MPLS dataplane, packet flows are enforced through a specific path by applying, at the ingress/head-end node, a specifically designed stack of SIDs fully compatible with the IPv4 data plane. In other words, in SR using an IPv4 dataplane, the SIDs are encoded into the packet as IPv4 addresses that are assigned to Adjacency Segments or Node Segments.

In SR using an IPv6 dataplane, as in SR using an MPLS dataplane, packet flows are enforced through a specific path by applying, at the ingress/head-end node, a specifically designed stack of SIDs fully compatible with the IPv6 data plane. In other words, in SR using an IPv6 dataplane, the SIDs are encoded into the packet as IPv6 addresses that are assigned to Adjacency Segments or Node Segments.

Various example embodiments for supporting forwarding of source routed packets in packet switched networks based on flexible path encoding, as indicated above, are configured to improve the overhead typically imposed by the lists of hops typically encoded within the source routed packets (e.g., the list of SIDs in source routed packets that are based on SR-TE).

Various example embodiments for supporting forwarding of source routed packets based on flexible path encoding may be configured to support encoding of the explicit path for a source routed packet into the source routed packet as a variable sized bit string having bit positions corresponding to segments of the explicit path where the bit string has a variable length that is determined by the highest bit position that is set in the bit string (e.g., in a network having 100 segments, if the explicit path includes 5 segments corresponding to bit positions 3, 7, 10, 1, and 15, respectively, then the bit string is 15 bits long and the bit positions of the bit string are set as follows 100001001000101). Various example embodiments for supporting forwarding of source routed packets based on flexible path encoding, in this manner, may significantly reduce the overhead of encoding the explicit path within the source routed packet (e.g., since a single bit offers a shortest form of representation of a segment identifier of a segment for source routing and since the length of the variable sized bit string is equal to the highest bit position encoded in the variable sized bit string even though other bit positions may be represented in the network). The potential benefits associated with use of flexible path encoding for encoding of the explicit path for a source routed packet into the source routed packet may be further understood by considering examples for use of SR-TE in MPLS, IPv4, and IPv6 data planes, as discussed further below.

For example, in SR using an MPLS dataplane, a packet traversing 30 "strict" hops will carry an ordered list of labels (e.g., where each label represents an Adjacency-SID) in the label stack that will start with 30 labels and decrease with popping of labels at each of the hops of the path (e.g., subsequent hops will carry 29 labels, 28 labels, 27 labels, and so forth, on the packet, respectively) and, further, which may increase if an intermediate hop performing a fast reroute (FRR) operation pushes additional labels onto the label stack. In MPLS, a label is 4 bytes (4 B) in size (including a 20-bit label value, a 3-bit Experimental Use (Exp) value, a 1-bit Bottom of Stack (S) value, and an 8-bit Time to Live (TTL) value). As such, an MPLS header that includes a stack of 30 MPLS labels results in 120 B of overhead on the packet. In a packet that includes 1500 bytes (which is the standard Maximum Transmission Unit (MTU) size in Ethernet), an MPLS header that includes a stack of 30 MPLS labels imposes an 8% overhead penalty, which translates to a loss of 800 megabits per second on a 10 Gigabit per second link. Similarly, if packets smaller than 1500 bytes, such as 512 bytes, are sent across the link, then the overhead penalty of an MPLS header that includes a stack of 30 MPLS labels is 23.4% or 2.30 gigabits per second on a 10 Gigabit per second link. While such overhead may be tolerable in certain networks (e.g., in private networks such as datacenter (DC) networks using intra-DC links), it may not be able to scale to the economics in SR deployments in public networks (e.g., Software Defined Wide Area Networks (SD-WANs), Service Provider Networks, Inter-Data-Centre networks, or the like). Various example embodiments for supporting forwarding of source routed packets in packet switched networks based on flexible path encoding, as indicated above, may be configured to reduce the overhead of source routed packets in SR using an MPLS dataplane based on the use of flexible path encoding. For example, in continuation of the 30 hop example above, assume that the maximum number of segments in a network is 127 and that these segments are assigned bit positions 1-127 of the bit string, respectively. If the segment that is assigned bit position 127 is included in the explicit path (i.e., the worst case), then the explicit path of 30 hops would incur overhead of 127 bits (approximately 16 B), which provides about an 86% reduction from use of MPLS labels as discussed above. If the segment with highest bit position is 64, then the explicit path of 30 hops would incur overhead of 64 bits (equal to 8 B), which provides about a 93% reduction from use of MPLS labels as discussed above. The best case is when the highest bit position is 30 (i.e., the explicit path is encoded with bits 1, 2, . . . , 30), in which case the explicit path incurs an overhead of 30 bits (approximately 4 B), which provides about a 96% reduction from use of MPLS labels as discussed above.

For example, in SR using an IPv4 dataplane, a packet traversing 30 "strict" hops will carry an ordered list of 30 IPv4 addresses (e.g., where each IPv4 address represents an Adjacency-SID). In IPv4, an IPv4 address is 4B in size. As such, a packet header that includes a list of 30 IPv4 addresses results in 120B of overhead on the packet. In a packet that includes 1500 bytes (which is the standard Media Transmission Unit (MTU) size in Ethernet), an MPLS header that includes a stack of 30 MPLS labels imposes an 8% overhead penalty, which translates to a loss of 800 megabits per second on a 10 Gigabit per second link. Similarly, if packets smaller than 1500 bytes, such as 512 bytes, are sent across the link, then the overhead penalty of an MPLS header that includes a stack of 30 MPLS labels is 23.4% or 2.30 gigabits per second on a 10 Gigabit per second link. While such overhead may be tolerable in certain networks (e.g., in private networks such as datacenter (DC) networks using intra-DC links links), it may not be able to scale to the economics in SR deployments in public networks (e.g., Software Defined Wide Area Networks (SD-WANs), Service Provider Networks, Inter-Data-Centre networks, or the like). Various example embodiments for supporting forwarding of source routed packets in packet switched networks based on flexible path encoding, as indicated above, may be configured to reduce the overhead of source routed packets in SR using an IPv4 dataplane based on the use of flexible path encoding. For example, in continuation of the 30 hop example above, assume that the maximum number of segments in a network is 127 and that these segments are assigned bit positions 1-127 of the bit string, respectively. If the segment that is assigned bit position 127 is included in the explicit path (i.e., the worst case), then the explicit path of 30 hops would incur overhead of 127 bits (approximately 16 B), which provides about an 86% reduction from use of IPv4 addresses as discussed above. If the segment with highest bit position is 64, then the explicit path of 30 hops would incur overhead of 64 bits (equal to 8 B), which provides about a 93% reduction from use of IPv4 addresses as discussed above. The best case is when the highest bit position is 30 (i.e., the explicit path is encoded with bits 1, 2, . . . , 30), in which case the explicit path incurs an overhead of 30 bits (approximately 4 B), which provides about a 96% reduction from use of IPv4 addresses as discussed above.

For example, in SR using an IPv6 dataplane, a packet traversing 30 "strict" hops will carry an ordered list of 30 IPv6 addresses (e.g., where each IPv6 address represents an Adjacency-SID). In IPv6, an IPv6 address is 16B in size. As such, a packet header that includes a list of 30 IPv6 addresses results in 480B of overhead on the packet. In a packet that includes 1500 bytes (which is the standard Media Transmission Unit (MTU) size in Ethernet), an MPLS header that includes a stack of 30 MPLS labels imposes a 32% overhead penalty, which translates to a loss of 3.2 gigabits per second on a 10 Gigabit per second link. While such overhead may be tolerable in certain networks (e.g., in private networks such as datacenter (DC) networks using intra-DC links links), it may not be able to scale to the economics in SR deployments in public networks (e.g., Software Defined-Wide Area Networks (SD-WANs), Service Provider Networks, Inter-Data-Centre networks, or the like). Various example embodiments for supporting forwarding of source routed packets in packet switched networks based on flexible path encoding, as indicated above, may be configured to reduce the overhead of source routed packets in SR using an IPv6 dataplane based on the use of flexible path encoding. For example, in continuation of the 30 hop example above, assume that the maximum number of segments in a network is 127 and that these segments are assigned bit positions 1-127 of the bit string, respectively. If the segment that is assigned bit position 127 is included in the explicit path (i.e., the worst case), then the explicit path of 30 hops would incur overhead of 127 bits (approximately 16 B), which provides about a 96% reduction from use of IPv6 addresses as discussed above. If the segment with highest bit position is 64, then the explicit path of 30 hops would incur overhead of 64 bits (equal to 8 B), which provides about a 98% reduction from use of IPv6 addresses as discussed above. The best case is when the highest bit position is 30 (i.e., the explicit path is encoded with bits 1, 2, . . . , 30), in which case the explicit path incurs an overhead of 30 bits (approximately 4 B), which provides about a 99% reduction from use of IPv6 addresses as discussed above.

Various example embodiments for supporting packet forwarding in communication networks, as indicated above, may be configured to support forwarding of source routed packets in packet switched networks based on flexible path encoding. Various example embodiments for supporting forwarding of source routed packets based on flexible path encoding may be configured to support encoding of the explicit path for a source routed packet into the source routed packet as a variable sized bit string. Various example embodiments for supporting forwarding of source routed packets based on flexible path encoding may be configured to support encoding of the explicit path for a source routed packet into the source routed packet as a variable sized bit string where the ingress router sends the source packet with the bit string and each forwarding router along the explicit path forwards the source routed packet along the explicit path based on the bit string (e.g., evaluates the bit string in the source routed packet to find the only bit for which it has a forwarding state, resets that bit in the bit string if the bit represents a local segment of the router (i.e., the end of the segment has been reached), and forwards the packet to the next-hop as per the forwarding state of that bit) until the source routed packet reaches the egress node of the explicit path (at which point the bit string is empty, which means that all segments in the explicit path have been traversed by the packet and the packet has reached the egress router of the explicit path). Various example embodiments for supporting forwarding of source routed packets based on flexible path encoding, in this manner may significantly reduce the overhead of forwarding lookups along the explicit path (e.g., as indicated above, the forwarding operation can be performed with a single lookup (i.e., formally O(1) lookup).

The communication system 100, as indicated above, is configured to support various example embodiments supporting forwarding of source routed packets based on flexible path encoding. The routers 111-1-111-8 include source routing elements 112-1-112-8 (collectively, source routing elements 112), respectively. The source routing elements 112 of the routers 111 may be configured to provide various functions of various embodiments for supporting forwarding of source routed packets based on flexible path encoding as presented herein (e.g., source node functions including generation of source routed packets configured based on flexible path encoding, transit node functions including handling of source routed packets configured based on flexible path encoding, egress node functions including handling of source routed packets configured based on flexible path encoding, or the like, as well as various combinations thereof). The controller 120 includes a source routing element 121. The source routing element 121 of the controller 120 may be configured to provide various functions of various embodiments for supporting forwarding of source routed packets based on flexible path encoding as presented herein (e.g., source routing path computation functions or source routing path computation support functions, control plane functions, or the like, as well as various combinations thereof).

It is noted that the ability to use various types of source routing (e.g., MPLS-based source routing, IPv4 source routing, IPv6 source routing, or the like) in various deployment scenarios (e.g., decentralized deployment scenarios or centralized deployment scenarios as discussed above) may be generalized in various ways. The ability to use various types of source routing (e.g., MPLS-based source routing, IPv4 source routing, IPv6 source routing, or the like) in various deployment scenarios may be generalized by considering generalized availability of a PCE that is configured to compute source routed paths (e.g., where the PCE may be deployed on the source node of the path (e.g., in the case of a decentralized deployment), a centralized controller (e.g., in the case of a centralized deployment), or the like). The ability to use various types of source routing (e.g., MPLS-based source routing, IPv4 source routing, IPv6 source routing, or the like) in various deployment scenarios may be generalized by considering generalized availability of routers that are configured to perform routing operations on source routed paths. Various example embodiments for supporting forwarding of source routed packets based on flexible path encoding may be agnostic of whether explicit path computation is performed by the source node or by a centralized controller, since the source routed packets encode the explicit path which may be used at the routers of the explicit path routing of source routed packets. Accordingly, in various example embodiments for supporting forwarding of source routed packets, including SR-TE packets, based on flexible path encoding, the term PCE may be used generically to refer to the entity that is responsible for explicit path computation and the term forwarding router or transit router may be used generically to refer to the entity that performs routing based on bit strings encoded within a source routed packet based on flexible path encoding.

Various example embodiments may be configured to provide improved routing of packets in packet switched networks. Various example embodiments may be configured to provide improved routing of various types of source routed packets (e.g., source routed packets, SR packets, SR-TE packets, or the like) for various types of source routing (e.g., source routing, SR, SR-TE, or the like) which may be supported in various types of packet switched networks (e.g., MPLS-based packet switch networks, IPv4-based packet switch networks, IPv6-based packet switch networks, or the like, as well as various combinations thereof). Various example embodiments may be configured to provide improved routing of source routed packets by supporting routing of source routed packets based on flexible path encoding. Various example embodiments may be configured to provide improved routing of source routed packets by supporting routing of source routed packets based on configuration of source routed packets based on flexible path encoding and configuration of nodes to support handling of source routed packets based on configuration of source routed packets based on flexible path encoding. Various example embodiments may be configured to provide improved routing of source routed packets by supporting routing of SR packets, including SR-TE packets, based on flexible path encoding. Various example embodiments for supporting forwarding of source routed packets based on flexible path encoding, in this manner, may significantly reduce the overhead of encoding the explicit path within the source routed packet (e.g., since a single bit offers a shortest form of representation of a segment identifier of a segment for source routing and since the length of the variable sized bit string is equal to the highest bit position encoded in the variable sized bit string even though other bit positions may be represented in the network), may significantly reduce the overhead of forwarding lookups along the explicit path (e.g., as indicated above, the forwarding operation can be performed with a single lookup (i.e., formally O(1) lookup), and may provide various other advantages or potential advantages. Various example embodiments configured to provide improved routing of packets in packet switched networks based on flexible path encoding may be configured to support various other functions for supporting routing of packets in packet switched networks based on flexible path encoding, may be configured to provide various other advantages or potential advantages related to supporting routing of packets in packet switched networks based on flexible path encoding, or the like, as well as various combinations thereof.

It is noted that various example embodiments for supporting forwarding of source routed packets, including SR packets such as SR-TE packet, based on flexible path encoding may be referred to herein "Flexible Bit Indexed Source Routing (FIB-SR)" (or, in the case of source routed packets based on SR, as "Flexible Bit Indexed Segment Routing (FIB-SR)"). As such, it will be appreciated that references herein to FIB-SR specific terms (e.g., FIB-SR network, FIB-SR forwarding plane, FIB-SR control plane, FIB-SR packet, and so forth), for at least some embodiments, may be read more generally as being references to the more generic associated terms.

Various example embodiments for supporting forwarding of source routed packets based on flexible path encoding may be configured to support forwarding of source routed packets based on flexible path encoding in a single domain network (e.g., using a single variable length bit string for encoding the segments of the explicit path within the single domain).

Various example embodiments for supporting forwarding of source routed packets based on flexible path encoding may be configured to support encoding of the explicit path for a source routed packet into the source routed packet as a variable sized bit string having bit positions corresponding to SIDs (e.g., prefix-SIDs or adjacency-SIDs) of the explicit path where the bit string has a variable length that is determined by the highest bit position that is set in the bit string (e.g., in a network having 100 segments, if the explicit path includes 5 segments with bit positions 3, 7, 10, 1, and 15, respectively, then the bit string is 15 bits long and is set as follows 100001001000101). Various example embodiments for supporting forwarding of source routed packets based on flexible path encoding may be configured to support encoding of the explicit path for a source routed packet into the source routed packet as a variable sized bit string where the ingress router sends the source packet with the bit string and each forwarding router along the explicit path forwards the source routed packet along the explicit path based on the bit string (e.g., evaluates the bit string in the source routed packet to find the only bit for which it has a forwarding state, resets that bit in the bit string if the bit represents a local segment of the router (i.e., the end of the segment has been reached), and forwards the packet to the next-hop as per the forwarding state of that bit) until the source routed packet reaches the egress node of the explicit path (at which point the bit string is empty, which means that all segments in the explicit path have been traversed by the packet and the packet has reached the egress router of the explicit path). These and various other embodiments may be further understood by considering an example within the context of the communication system 100 of FIG. 1.

In this example, assume that R1 intends to send a packet to R8 for a flow A with certain QoS constraints based on use of FIB-SR.

In this example, the communication system 100 is configured to support use of FIB-SR as follows.

The adjacency and prefix segments may be assigned bit positions that are unique within the communication system. For example, the adjacency and prefix segments may be assigned the bit positions as depicted in FIG. 2. It is noted that there are a total of 36 segments in the communication system 100, as indicated by the 36 bit positions assigned as illustrated in FIG. 2.

The routers R1-R8 each may be configured with FIB-SR Forwarding Tables including the forwarding states of the bit positions of segments. The forwarding states of the bit positions of segments are entries in FIB-SR Forwarding Table, where each entry includes the mapping of the bit position to corresponding adjacent next-hop. The FIB-SR Forwarding Table in each router includes the bit positions for all prefix segments in the network and its locally connected Adjacency Segments. It is noted that the adjacent next-hop for a remote prefix segment may be computed using a suitable path computation algorithm (e.g., a Shortest Path First (SPF) algorithm or the like). Additionally, the FIB-SR Forwarding Table also has the Forwarding Bit Mask (F-BM), which is the bit string that includes all of the valid bit positions in the FIB-SR Forwarding Table and which may be used for lookups when determining forwarding of FIB-SR packets (e.g., based on AND-ing of the variable sized bit string in the packet and the F-BM of the FIB-SR Forwarding Table). The FIB-SR Forwarding Table for R2 is depicted in FIG. 3. In the FIB-SR Forwarding Table for R2 depicted in FIG. 3, bit positions 1 and 3-8 represent the remote prefix segments, bit position 2 represents the local prefix segment, and bit positions 10-13 represent the adjacency segments locally connected to R2. Additionally, in the FIB-SR Forwarding Table for R2 depicted in FIG. 3, the F-BM is the bit string that corresponding to {1,2,3,4,5,6,7, 8,10,11,12,13}: namely, 1111011111111 (with only the bit position 9 not being set). It will be appreciated that, although omitted herein, each of the routers R1 and R3-R8 may be similarly configured with FIB-SR Forwarding Tables, respectively.

It will be appreciated that configuration of the communication system 100 to support use of FIB-SR (e.g., assignment of the mapping of the segments to their respective bit positions, programming of forwarding state in the routers, and so forth) may be performed in a centralized or decentralized manner.

In the centralized approach, the mapping of the segments to their respective bit positions may be assigned by a centralized controller (e.g., PCE or SDN controller). The centralized approach ensures that globally unique bit positions are allocated to each segment in the network. In the controller driven approach, the controller may also program the forwarding states of the bit positions of segments in the router. The controller may compute the adjacent next-hop for the remote prefix segments at each router based on an SPF algorithm or other suitable algorithm.

In the decentralized approach, each of the routers may be manually configured with the bit positions for the local prefix segment and the locally connected adjacency segments. The configuration at each router is designed to ensure that globally unique bit positions are allocated to its local segments. Interior Gateway Protocols (IGPs) running across the routers (e.g., OSPF, IS-IS, or the like) may then flood the mappings of segments to respective bit positions across the network in Link State Advertisements (LSAs). The IGP in each router computes the adjacent next-hops for the remote prefix segments by running an algorithm (e.g., SPF or the like). The IGP in each router also programs the FIB-SR Forwarding Table at the router with all prefix segments and locally connected adjacency segments.

In this example, assume that R1 intends to send a packet to R8 for a flow A with certain QoS constraints based on use of FIB-SR. The PCE controller computed the explicit path {R1->R2, R2->R4, R4->R7, R7->R8} that meets QoS constraints of the flow A. R1 intends to send packets for the flow along the path using FIB-SR. So, R1 encodes a bit string containing the bit positions of segments {R2->R4, R4->R7, R7->R8}, i.e., bit positions 12, 21, and 34, respectively. Note that, since R1->R2 is the locally connected adjacency segment of R1, this segment is not encoded in the bit string. The bit string of length 34 bits would be precisely 1000000000000100000000100000000000, where the bit positions are numbered from the right most bit toward the left most bit. Here, there are only 34 bits in the bit string, even though 36 bit positions are supported in the network, since the largest bit position associated with a segment included in the explicit path is bit position 34 for R7->R8. It is noted that, for simplicity, the bit string also may be represented herein as a set of integers wherein each integer is a bit position in the bit string. For example, the bit string here is denoted as {12,21,34}, which is encoded in the packet using the actual bit string 1000000000000100000000100000000000. R1 sends the packet to R2 over next-hop R1->R2.

In this example, R2 receives the packet from R1 with the bit string {12,21,34}, which is encoded in the packet using the actual bit string 1000000000000100000000100000000000. R2 evaluates the bit string {12,21,34} to look for the only bit for which it has the forwarding state. R2 may use a linear bit-by-bit evaluation of the bit string (which involves O(N) lookup, wherein N is the number of bits in the bit string) or may evaluate the bit string using a bitwise-AND operation between the bit string and the F-BM configured at the router as follows: bit=Packet bit string & F-BM (which is an O(1) operation to find the bit). In this example, for the packet received by R2, the bit is determined as {12,21,34} & {1,2,3,4,5,6,7,8,10, 11,12,13}->12. R2, after identifying the bit as being bit 12, performs a lookup in FIB-SR Forwarding Table using bit 12 as an index which, as illustrated in FIG. 3, results in identification of next-hop R2->R4 as the next hop for the packet. Since the entry in index 12 indicates it as local segment, R2 resets the bit position 12 in the bit string and sends the packet on R2->R4 with the bit string {21, 34} of length 34 bits (since bit 34 still needs to be encoded in the packet, as the SID associated with bit 34 has not yet been encountered by the packet).

In this example, R4 receives the packet from R2 with the bit string {21,34}, which is encoded in the packet using the actual bit string 1000000000000100000000000000000000. R4 evaluates the bit string {21,34} to look for the only bit for which it has the forwarding state, such as by using a bitwise-AND operation between the bit string and the F-BM configured at R4. In this example, for the packet received by R4, R4 determines that the bit is bit 21 and performs a lookup in FIB-SR Forwarding Table using bit 21 as an index, which results in identification of next-hop R4->R7 as the next hop for the packet. Since the entry in index 21 indicates it as local segment, R4 resets the bit position 21 in the bit string and sends the packet on R4->R7 with the bit string {34} of length 34 bits (since bit 34 still needs to be encoded in the packet, as the SID associated with bit 34 has not yet been encountered by the packet).

In this example, R7 receives the packet from R4 with the bit string {34}, which is encoded in the packet using the actual bit string 10000000000000000000000000000000000.
R7 evaluates the bit string {34} to look for the only bit for which it has the forwarding state, such as by using a bitwise-AND operation between the bit string and the F-BM configured at R7. In this example, for the packet received by R7, R7 determines that the bit is bit 34 and performs a lookup in FIB-SR Forwarding Table using bit 34 as an index, which results in identification of next-hop R7->R8 as the next hop for the packet. Since the entry in index 34 indicates it as local segment, R7 resets the bit position 34 the bit string. R7, since the bit string is now empty (i.e., no bits are set after bit 34 is reset by R7), removes the bit string from the packet and sends the packet on R7->R8.

In this example, R8 receives the packet from R7 and processes the packet based on the underlying header(s).

It will be appreciated that various functions described as being performed by routers in the example discussed above may be performed by various routers of the communication network for supporting forwarding of FIB-SR packets based on flexible path encoding.

Various example embodiments for supporting forwarding of FIB-SR packets based on flexible path encoding may be configured to support fast rerouting (FRR) of the FIB-SR packets.

Various example embodiments for supporting forwarding of FIB-SR packets based on flexible path encoding may be configured to support link protection FRR of the FIB-SR packets. Link protection enables FRR on the failure of the next-hop link. To enable link protection, a router computes a detour path for each respective next-hop of the router. The detour path terminates on the same next-hop. It is noted that such detour paths may be computed using any suitable algorithms configured to compute the shortest detour paths that work around the failure (e.g., Loop Free Alternate (LFA), Remote LFA, Topologically Independent LFA (TI-LFA), or the like). The use of link protection FRR of the FIB-SR packets may be further understood by way of reference to an example based on the communication network 100 of FIG. 1 (e.g., based on the example above in which R1 intends to send a packet to R8 for a flow A with certain QoS constraints based on use of FIB-SR along the explicit path {R1->R2, R2->R4, R4->R7, R7->R8}), which is described with respect to FIG. 4.

The routers R1-R8 each may be configured with FIB-SR Forwarding Tables including the forwarding states of the bit positions of segments (as presented with respect to FIG. 3) and further including link protecting detour paths protecting against failures of immediate next-hops of the routers, respectively. The detour paths are precomputed and preprogramed into the FIB-SR Forwarding Table. The FRR detour paths for link protection for R2 are depicted in FIG. 4. The FIB-SR Forwarding Table for R2 (which is an expanded version of the FIB-SR Forwarding Table for R2 that is depicted in FIG. 3) that also includes link protecting detour paths protecting against failures of immediate next-hops of R2 also is depicted in FIG. 4. In the FIB-SR Forwarding Table for R2 depicted in FIG. 4, the third column from the left (denoted as "Link Protection Detour/Bit String" shows the detour paths and their respective bit strings for R2 that protect against failures of respective next-hops in the second column from left. It will be appreciated that, although omitted herein, each of the routers R1 and R3-R8 may be similarly configured with FIB-SR Forwarding Tables including link protecting detour paths, respectively.

Reconsider the previous example in which R1 intends to send a packet to R8 for a flow A with certain QoS constraints based on use of FIB-SR using the explicit path {R1->R2, R2->R4, R4->R7, R7->R8} that meets QoS constraints of the flow A. R1 encodes a bit string containing the bit positions of segments {R2->R4, R4->R7, R7->R8}, i.e., bit positions 12, 21, and 34, respectively (i.e., bit string 100000000000010000000100000000000). R1 sends the packet to R2 over next-hop R1->R2.

In this example, R2 receives the packet from R1 with the bit string {12,21,34}, which is encoded in the packet using the actual bit string 100000000000010000000100000000000. R2 evaluates the bit string {12,21,34} to look for the only bit for which it has the forwarding state. R2, after identifying the bit as being bit 12, performs a lookup in FIB-SR Forwarding Table using bit 12 as an index which, as illustrated in FIG. 4, results in identification of next-hop R2->R4 as the next hop for the packet. In this example, assume that next-hop R2->R4 failed and that R2 determines that next-hop R2->R4 for bit 12 has failed. So, the packet needs to be fast-rerouted via detour path {R2->R3, R3->R4}. Since bit 12 is a local segment, Point of Local Repair (PLR) R2 resets the bit 12 in the bit string and sets bit 15 in the bit string to encode the remote segment R3->R4 of the detour path. Then, R2 sends the packet to first segment of the detour path (i.e., R2->R3) with bit string {15, 21, 34} (corresponding to bit string 100000000000010000010000000000000).

In this example, R3 receives the packet from R2 with the bit string {15,21,34}, which is encoded in the packet using the actual bit string 100000000000010000010000000000000. R3 evaluates the bit string {15,21,34} to look for the only bit for which it has the forwarding state, such as by using a bitwise-AND operation between the bit string and the F-BM configured at R3. In this example, for the packet received by R3, R3 determines that the bit is bit 15 and performs a lookup in FIB-SR Forwarding Table using bit 15 as an index, which results in identification of next-hop R3->R4 as the next hop for the packet. R4 is the merge point (MP) of the packet where the packet joins back along its original explicit path. Since the entry in index 15 indicates it as local segment, R3 resets the bit position 15 in the bit string and sends the packet on R3->R4 with the bit string {21,34}.

In this example, R4 receives the packet from R3 with the bit string {21,34}, which is encoded in the packet using the actual bit string 100000000000010000000000000000000. As indicated above, R4 is the MP of the packet where the packet joins back along its original explicit path. Accordingly, from R4 onwards, the packet is forwarded along the explicit path as described with respect to the original example (assuming that no further failures are encountered along the explicit path).

Various example embodiments for supporting forwarding of FIB-SR packets based on flexible path encoding may be configured to support node protection FRR of the FIB-SR packets. Node protection provides a detour path to protect against failure of a neighboring router. For example, if there is a detour path from a router to protect against failure of a neighboring router, then the detour also provides protection against failure of the link between the router and the neighboring router. It is noted that such detour paths may be computed using any suitable algorithms configured to compute the shortest detour paths that work around the failure (e.g., LFA, Remote LFA, TI-LFA, or the like). It is also noted that the node protection detour paths are for prefix segments that are not neighbors, since adjacency segments terminate on a neighbor router. The use of node protection FRR of the FIB-SR packets may be further understood by way of reference to an example based on the communication network 100 of FIG. 1 (e.g., based on the example above in which R1 intends to send a packet to R8 for a flow A with certain QoS constraints based on use of FIB-SR along the explicit path {R1->R2, R2->R4, R4->R7, R7->R8}), which is described with respect to FIG. 5.

The routers R1-R8 each may be configured with FIB-SR Forwarding Tables including the forwarding states of the bit positions of segments (as presented with respect to FIG. 3) and link protecting detour paths protecting against failures of immediate next-hops of the routers (as presented with respect to FIG. 4) and, further, including node protecting detour paths protecting against failure of immediate neighbors of the routers, respectively. The detour paths are precomputed and preprogramed into the FIB-SR Forwarding Table. The FRR detour paths for node protection for R2 are depicted in FIG. 5. The FIB-SR Forwarding Table for R2 (which is an expanded version of the FIB-SR Forwarding Table for R2 that is depicted in FIG. 3 and FIG. 4) that also includes node protecting detour paths protecting against failures of immediate neighbors of R2 also is depicted in FIG. 5. In the FIB-SR Forwarding Table for R2 depicted in FIG. 5, the fourth column from the left (denoted as "Node Protection Backup Next Hop" shows the next-hops for the detour paths providing node protection for failure of immediate neighbors of R2.

As illustrated in FIG. 5, node protection detour paths are computed for prefix segments R6-R8 (which are programmed against bits 6-8 respectively), while bits 3-5 and 10-13 continue to be link protected only. So, R2 can provide node protection for R6-R8 only as there are no node protecting detour paths for prefix segments R1 and R3-R5. It is noted that, since R6-R8 are loose source routed, node protection detours are not programmed by their explicit paths; rather, the immediate next-hop of the detour path is programmed as the "Backup Next-Hop" for providing node protection for failure of immediate neighbors of R2. For example, for R6 the computed primary path is R2->R4->R6 and the detour to protect against failure of R4 is R2->R5->R6. So, the next-hop for bit 6 is R2->R4 and its backup is R2->R5.

As further illustrated in FIG. 5, bits 6-8 also can have link protection simultaneously. A PLR such as R2 may be capable of discriminating between link and node failures and, accordingly, may fast-reroute packets via a link protection detour or via a node protection backup next-hop. For example, R2 may run a single-hop Bi-directional Forwarding Detection (BFD) session A over next-hop R2->R4 to detect failure of that next-hop and may also run a multi-hop BFD session B over the link protection path {R2->R3, R3->R4} by sending the BFD packets with FIB-SR bit string {18}. If session A fails while session B remains alive, then it means R4 is alive and, thus, R2 will fast-reroute packets for bits 6-8 via the link protection detour paths. If both session A and session B fail, then it means either the link protection path has failed or R4 has failed and, thus, R2 will fast-reroute packets for bits 6-8 via the node protection backup next-hops.

It will be appreciated that, although omitted herein, each of the routers R1 and R3-R8 may be similarly configured with FIB-SR Forwarding Tables including node protecting detour paths, respectively.

Reconsider the previous example in which R1 intends to send a packet to R8 for a flow A with certain QoS constraints based on use of FIB-SR using the explicit path {R1->R2, R2->R4, R4->R7, R7->R8} that meets QoS constraints of the flow A. R1 encodes a bit string containing the bit positions of segments {R2->R4, R4->R7, R7->R8}, i.e., bit positions 12, 21, and 34, respectively (i.e., bit string 10000000000001000000001000000000000). R1 sends the packet to R2 over next-hop R1->R2.

In this example, R2 receives the packet from R1 with the bit string {12,21,34}, which is encoded in the packet using the actual bit string 10000000000001000000001000000000000. R2 evaluates the bit string {12,21,34} to look for the only bit for which it has the forwarding state. R2, after identifying the bit as being bit 12, performs a lookup in FIB-SR Forwarding Table using bit 12 as an index which, as illustrated in FIG. 5, results in identification of next-hop R2->R4 as the next hop for the packet.

In this example, assuming that node R4 has failed and that R2 is incapable of determining that R4 is unavailable due to a node failure of R4 rather than just due to a link failure of the R2->R4 link between R2 and R4, R2 may attempt to fast reroute the packet based on the link protection detour path specified for bit 12 in the FIB-SR Forwarding Table of FIG. 5 (e.g., in the manner as discussed in the example provided in conjunction with FIG. 4). Namely, since bit 12 is a local segment, PLR R2 may reset bit 12 in the bit string, set bit 15 in the bit string to encode the remote segment R3->R4 of the detour path, and sends the packet to first segment of the detour path (i.e., R2->R3) with bit string {15, 21, 34} (corresponding to bit string 10000000000001000010000000000000000). In this case, however, since R4 failed, R2->R4 also failed and, thus, if R2 fast-reroutes the packet via detour path {R2->R3, R3->R4}, then, when the packet reaches R3, R3 cannot forward the packet to R4 via R3->R4 or any of its local detours to R4 (again, since R4 itself failed). In other words, the link protection detour path that is available will not be successful in rerouting the packet around the failure of R4.

In this example, assuming that node R4 has failed and that either R2 is capable of determining that R4 is unavailable due to a node failure of R4 rather than just due to a link failure of the R2->R4 link (in which case R2 will not attempt to reroute the packet based on the link protection detour path specified for bit 12 in the FIB-SR Forwarding Table of FIG. 5) or has attempted to reroute the packet based on the link protection detour path specified for bit 12 in the FIB-SR Forwarding Table of FIG. 5 and has determined that such rerouting is unsuccessful, may either drop the packet or attempt to reroute the packet around the failed node R4 using a different type of protection mechanism. For example, in this case, it may be seen that R2 could have fast rerouted the packet to its egress router R8 by encoding bit 8 as the only hop in a loose explicit path (namely, in R2, bit 8 is programmed with next-hop R2->R4, which failed, but it has the back-up next hop R2->R5, so the fast-rerouted packet encoded with bit 8 will eventually get forwarded on the backup next-hop R2->R5, thereby protecting against failure of R4). However, R2 cannot fast reroute the packet using bit 8 since, from the received bit string {12,21,34}, R2 does not know that R8 is the egress router of the packet. In at least some example embodiments, however, R2 may be able to fast reroute the packet to R8 based on use of a global node protection mechanism in which, along with encoding of the explicit path for the packet, a global merge point (MP) is encoded within the packet and, further, in which any router along the explicit path that detects a failure in the next-hop node in the explicit path can reroute the packet to the global MP by replacing the original strict explicit path with a loose hop explicit path containing the global MP only (e.g., using the prefix-SID of the egress router as the global MP). In at least some example embodiments, a global MP is explicitly provided by the head-end router, along with the bit string of the packet, in order to support a global node protection mechanism for FIB-SR. In at least some example embodiments, the global MP is appended to the bit string as the "integer value" of the bit position assigned to the prefix segment that identifies the egress router of the packet. For example, for flow A, the egress router is R8 which is assigned bit position 8. So, integer value 8 is appended to the bit string as the global MP. Thus, for flow A, if R1 seeks node protection for its packets along any transit router then R1 would originate the packet with bit string {12,21,34} <8> (where, here, the global MP is denoted with "< >"). In this case, in continuation of the example, above, that router R4 failed. When R2 receives the packet {12,21,34} <8>, it finds that, for bit 12, both next-hop R2->R4 and its link protection detour path {R2->R3, R3->R4} have failed. Since global MP <8> is encoded in the packet, so R2 resets all bits in the bit string and then sets only the bit 8 in the bit string to form the loose hop explicit path to R8. R2 looks up the FIB-SR Forwarding Table for index 8 and finds next-hop R2->R4 that has failed. So R2 fast-reroutes the packet over backup next-hop R2->R5 with bit string {8}. On receiving the packet with bit string {8}, R5 looks up the bit 8 in its forwarding state which results in the next-hop along the shortest path from R5 to R8. Since bit 8 is not a local segment, R5 keeps the bit in bit string. R5 forwards the packet with bit string {8} to the next-hop. The same procedure is followed by subsequent nodes until the packet reaches the egress router R8.

It will be appreciated that various example embodiments for supporting forwarding of source routed packets based on flexible path encoding in a single domain network may be configured to provide various other functions for supporting forwarding of source routed packets based on flexible path encoding in a single domain network.

Various example embodiments for supporting forwarding of source routed packets based on flexible path encoding may be configured to support forwarding of source routed packets based on flexible path encoding in a multiple domain network (e.g., using a chain of multiple variable length bit strings encoding multiple sets of segments traversed in the multiple domains, respectively).

It will appreciated that, although primarily presented herein with respect to embodiments in which the maximum length of the bit string is 256 bits (which is the maximum length for the O(1) lookup of the bit string in the FIB-SR Forwarding Table since it involves a bitwise-AND operation between the bit string and the F-BM in order to find the exclusive bit based on which forwarding decision is made), other suitable bit string maximum lengths may be used (e.g., 128 bits, 512 bits, or the like).

It will be appreciated that limiting the maximum bit string length to a particular length (e.g., 256 bits, or any other suitable length, as discussed above) effectively limits the number of segments that can be supported in the FIB-SR network. However, a network can have more segments than the number of segments that may be supported by the FIB-SR network (e.g., a FIB-SR network may include more than 256 segments even though the maximum bit string length is 256 bits). Accordingly, in at least some example embodiments, any suitable number of segments may be supported (e.g., even where the number of segments exceeds the number of bit positions of the maximum bit string length) based on use of a multi-domain architecture in which, for each of the domains, the domain supports its own domain-specific bit string having its own maximum bit string length based on the number of segments of the domain, respectively. It will be appreciated that such a multi-domain architecture enables scaling of a network to any size. This may be further understood by way of reference to FIG. 6.

Figure 6:
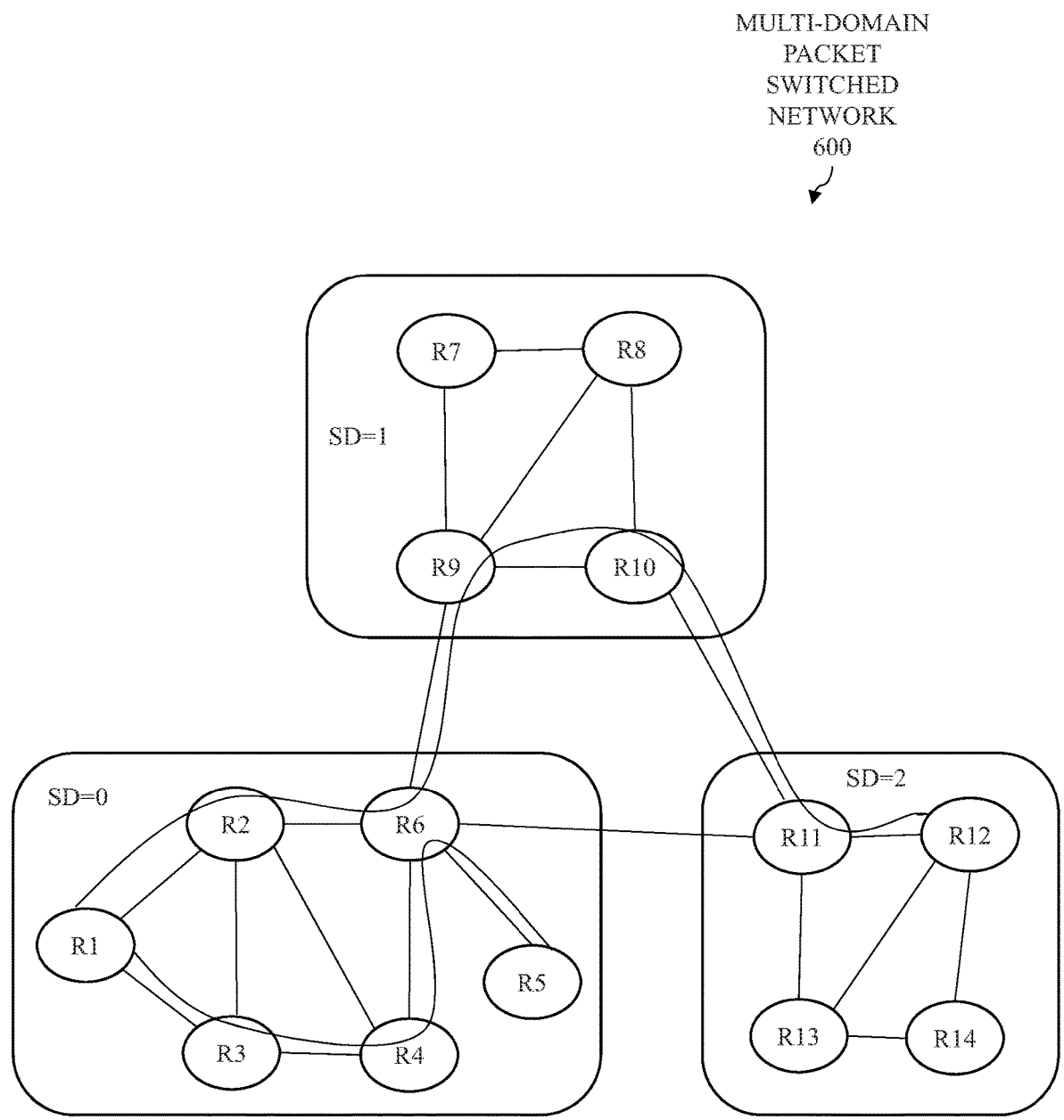
FIG. 6 depicts an example embodiment of a multi-domain packet switched network configured to support packet forwarding based on flexible path encoding.

FIG. 6 depicts an example embodiment of a multi-domain packet switched network configured to support packet forwarding based on flexible path encoding.

The multi-domain packet switched network 600 includes fourteen routers (denoted as R1-R14) which are organized into three sub-domains (SDs) (denoted as SD-0, SD-1, and SD-2) as follows: SD=0 includes R1-R6, SD=1 includes R7-R10, and SD=2 includes R11-R14.

The multi-domain packet switched network 600 is configured such that, for each of the SDs, the SD supports its own bit string having bit positions defined for that SD, respectively. In other words, unique bit positions are assigned to segments within an SD only and, thus, segments in different SDs may have overlapping bit positions. It is assumed that a maximum bit string size of 256 bits is supported for each of the SDs and, thus, each of the SDs can accommodate up to 256 segments (which may include prefix segments of member routers and adjacency segments interconnecting them); however, for simplicity, multi-domain packet switched network 600 includes fewer segments in each of the SDs.

The multi-domain packet switched network 600 is configured such that some of the adjacency segments connect routers located in different SDs. These adjacency segments that connect routers located in different SDs are referred to herein as inter-domain adjacency segments. In FIG. 6, for example, R6->R9 and R9->R6 are inter-domain adjacency segments between SD=0 and SD=1, R10->R11 and R11->R10 are inter-domain adjacency segments between SD=1 and SD=2, and R6->R11 and R11->R6 are inter-domain adjacency segments between SD=0 and SD=2. An inter-domain adjacency segment belongs to the SD where its local end resides. For example, the segment R10->R11 belongs to SD=0 since local-end R10 resides in SD=0, the segment R11->R10 belongs to SD=1, since R11 resides in SD=1, and so forth. Accordingly, the bit position is assigned to an inter-domain adjacency segment from the bit string space of its SD. The assignments of bit positions for segments in SD=0, SD=1, and SD=2 are depicted in FIG. 7.

The multi-domain packet switched network 600 is configured such that a FIB-SR packet is sent with a chain of variable length bit strings, where each bit string contains the bit positions of the segments traversed in specific SD. The bit strings are ordered based on the order of traversal of the SDs, respectively. Each bit string is encoded by specifying the SD to which it belongs. The global MP for node protection (i.e., the bit position of the egress router), if included by the head-end router, is also encoded with the SD of the global MP, if a FIB-SR packet traverses an explicit path with segments in SDs X, Y, Z to the egress router Rc located in SD=Z then the head-end router encodes the packet with chain of bit strings as follows: {SD=X: bit string for X}, {SD=Y: bit string Y}, {SD=Z: bit string for Z} <SD=Z: Rc>. A receiving router of a FIB-SR packet evaluates the first (top most) bit string in the FIB-SR packet and determines handling of the FIB-SR packet based on the first (top most) bit string in the FIB-SR packet. It is noted that a FIB-SR packet that traverses multiple SDs is referred to as an inter-domain packet, whereas a packet that traverses a single SD is referred to as an intra-domain packet. These and various other embodiments may be further understood by considering some examples within the context of the multi-domain packet switched network 600 of FIG. 6.

For these examples, which are discussed further below, assume that the routers R1-R14 of multi-domain packet switched network 600 are configured as follows. The routers R1-R14 each may be configured with FIB-SR Forwarding Tables including the forwarding states of the bit positions of segments. A router Rx may be configured with a set of FIB-SR Forwarding Tables that includes a FIB-SR Forwarding Table for each SD (namely, a FIB-SR Forwarding Table for the local SD to which the router Rx belongs and FIB-SR Forwarding Tables for each of the remote SDs remote from the SD to which the router Rx belongs), respectively. The FIB-SR Forwarding Table for the local SD to which the router Rx belongs includes the entries for all prefix segments in the SD and the locally connected adjacency segments of the SD. The FIB-SR Forwarding Table for a remote SD includes the entries for the prefix segments in the SD only. Additionally, the FIB-SR Forwarding Tables for the router Rx each have an associated F-BM, which is the bit string that includes all of the valid bit positions in the respective FIB-SR Forwarding Table and which may be used for lookups when determining forwarding of FIB-SR packets using the respective FIB-SR Forwarding Table. It will be appreciated that, although omitted herein, each of the routers R1 and R3-R14 may be similarly configured with sets of FIB-SR Forwarding Tables for the SDs, respectively.

In a first example, assume that R1 intends to send a packet to R5 for a flow A, along the explicit path {R1->R3, R3->R4, R4->R6, R6->R5}, with certain QoS constraints based on use of FIB-SR with global node protection. Flow A is an intra-domain flow contained within SD=0. So, R1 would encode an intra-domain FIB-SR packet for flow A with the single bit string {SD=0: 15, 18, 22} <SD=0: 5> and send the packet over R1->R3. When R3 receives the packet, it finds that bit 15 has the forwarding state to R3->R4 in the FIB-SR Forwarding Table in SD=0. So, R3 forwards the packet over R3->R4 with bit string {SD=0: 18, 22} <SD=0: 5>. When R4 receives the packet, it finds that bit 18 in SD=0 has the forwarding state to R4->R6. So, R4 forwards the packet over R4->R6 with bit string {SD=0:22} <SD=0: 5>. When R6 receives the packet, it finds the bit 22 in SD=0 has the forwarding state to R6->R5. Since the bit string is now empty, so R6 removes the bit string and forwards the packet over R6->R5. Upon receiving the packet, R5 processes the packet based on the underlying native header(s) in the packet.

In a second example, assume that R1 intends to send a packet to R12 for a flow B, along the explicit path {R1->R2, R2->R6, R6->R9, R9->R10, R10->R11, R11->R12}, with certain QoS constraints based on use of FIB-SR with global node protection. Flow B is an inter-domain flow spanning the SDs SD=0, SD=1, and SD=2. So, R1 would encode an inter-domain FIB-SR packet for flow B with the chain of bit strings {SD=0: 12, 23}, {SD=1: 13, 16}, {SD=2:7} <SD=2: 2> and send the packet over R1->R2. When R2 receives the packet, it evaluates the first bit string, which is in SD=0. R2 finds that bit 12 has the forwarding state to R2->R6 in FIB-SR Forwarding Table in SD=0, so R2 resets bit 12 and sends the packet with bit strings {SD=0: 23}, {SD=1: 13, 16}, {SD=2:7} <SD=2: 2> over R2->R6. When R6 receives the packet, it finds that bit 23 in SD=0 has the forwarding state to R6->R9, so R6 resets bit 23 in the bit string. Since the bit string in SD=0 is now empty, R6 removes the bit string from the packet and sends the packet over R6->R9 with bit strings {SD=1: 13, 16}, {SD=2:7} <SD=2: 2>. When R9 receives the packet, it evaluates the first bit string, which is in SD=1. R9 finds that bit 13 in SD=1 has the forwarding state to R9->R10, so R9 resets bit 13 in the bit string and sends the packet to R9->R10 with bit strings {SD=1: 16}, {SD=2:7} <SD=2: 2>. When R10 receives the packet, it finds that bit 16 in SD=1 has the forwarding state to R10->R11, so R10 resets bit 16 in the bit string. Since the bit string in SD=1 is now empty, R10 removes the bit string and sends the packet over R10->R11 with bit string {SD=2: 7} <SD=2: 2>. Upon receiving the packet, R11 finds that bit 7 in SD=2 has the forwarding state to R11->R12, so R11 resets the bit 7 in bit string. Since the bit string is now empty, R11 removes the bit string and sends the packet to R12 with underlying native header(s). Upon receiving the packet, R12 processes the packet based on the native header(s).

It will be appreciated that various example embodiments for supporting forwarding of source routed packets based on flexible path encoding in a multi-domain network may be configured to provide various other functions for supporting forwarding of source routed packets based on flexible path encoding in a multi-domain network.

Various example embodiments for supporting forwarding of source routed packets based on flexible path encoding may be configured to support forwarding of source routed packets based on flexible path encoding based on use of a forwarding plane configured to support forwarding of source routed packets based on flexible path encoding.

Various example embodiments for supporting forwarding of source routed packets based on flexible path encoding may be configured to support forwarding of source routed packets based on use of a packet having a header and a payload, where the header is configured to encode a set of one or more bit strings corresponding to one or more SDs traversed by the packet along the explicit path for the packet (namely, one bit string in the case of a single SD network or a path traversing only a single SD in a multi-SD network or multiple bit strings in the case of a path traversing multiple SDs in a multi-SD network), and where each of the one or more bit strings corresponding to the one or more SDs traversed by the packet along the explicit path for the packet encodes the path (for a single-SD path) or path portion (for a multi-SD path) traversed by the packet within the respective SD. It will be appreciated that the packet may be referred to herein as a FIB-SR packet having a FIB-SR Header and payload, where the FIB-SR Header includes a FIB-SR Common Header, a stack of one or more Bit String Headers, and, optionally (where global node protection is used), a Global MP Header. It also will be appreciated that the FIB-SR packet including the FIB-SR Header and payload may be sent in various ways, such as by using a layer-2 header, using a layer-2 header and an optional MPLS label (an example of which is presented with respect to FIG. 9), or the like.

In at least some embodiments, a FIB-SR packet may be transported using a layer-2 header (e.g., an Ethernet header). The Ethertype field in the Ethernet Header indicates its payload type. A new Ethertype value (e.g., 0x1388 or any other suitable value) may be defined in order to indicate the payload as being an FIB-SR packet. It is noted that this Ethertype value may or may not be reserved in the IEEE 802 Numbers registry of the International Assigned Numbers Authority (IANA).

In at least some embodiments, a FIB-SR packet may be transported using an MPLS Label and a layer-2 header (e.g., an Ethernet header). As indicated above, an example of transport of a FIB-SR packet in this manner is presented in FIG. 9, which illustrates a packet 900 configured to transport a FIB-SR packet. The MPLS Label may be used to encapsulate the FIB-SR packet where the MPLS Label is used to indicate to the receiver of the packet that its payload is a FIB-SR packet. For example, the MPLS Label may be used to encapsulate the FIB-SR packet where an Ethertype value is not reserved for FIB-SR. The MPLS label is advertised by the receiver to its potential neighbors, in order to indicate to the neighbors that the MPLS Label maps to a FIB-SR packet underneath. It will be appreciated that this label mapping, for mapping the MPLS Label to the FIB-SR packet type, may be advertised using a control plane protocol (e.g., LDP, BGP, OSPF, IS-IS, or the like) can be explicitly programmed into each router by a centralized controller (e.g., an SDN controller). In this case, the next layer specific field in the layer-2 header is MPLS since the layer-2 header is encapsulating an MPLS Label.

Figure 9:
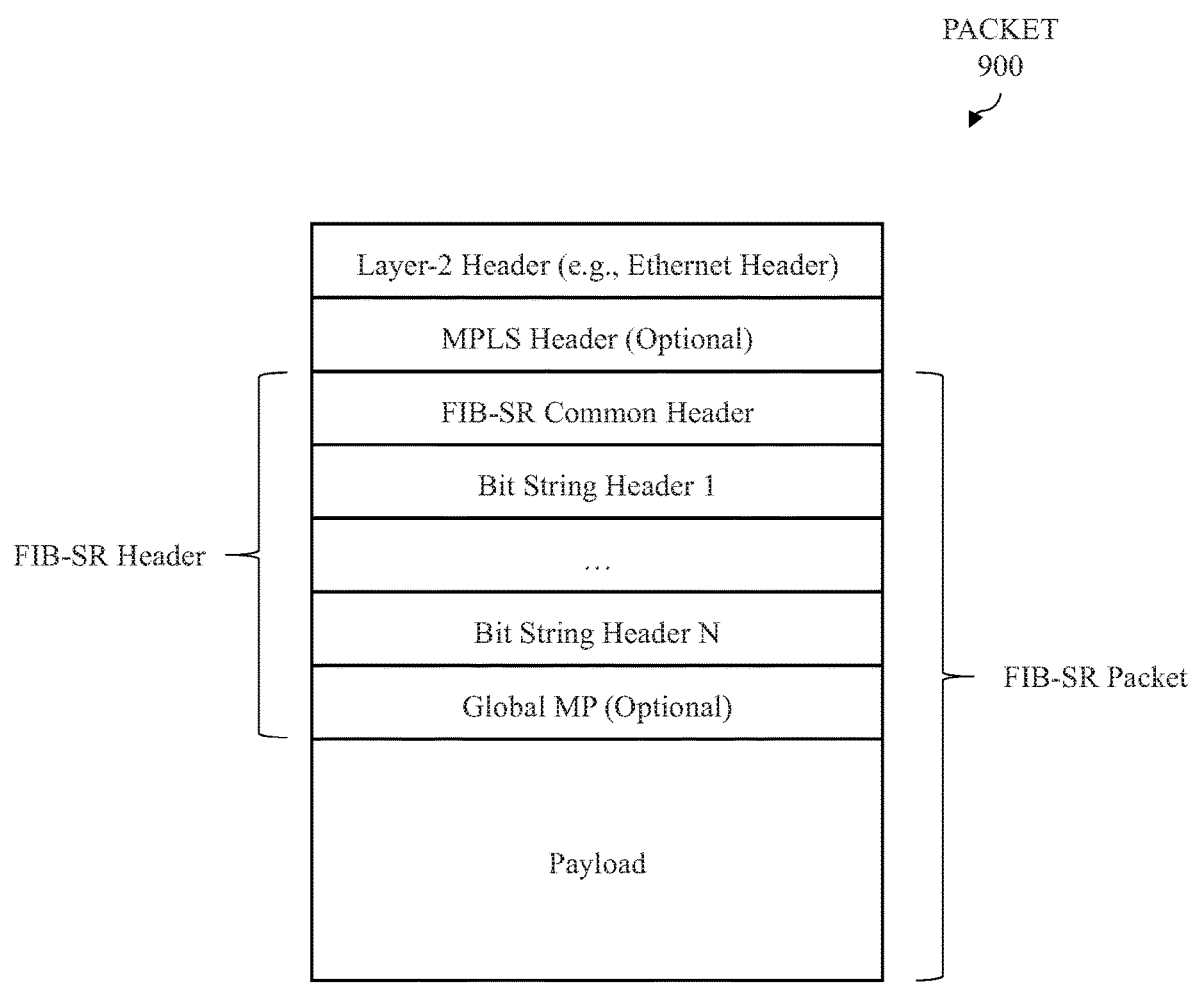
FIG. 9 depicts an example embodiment of a source routed packet configured for packet forwarding based on flexible path encoding.

The FIB-SR Header, as indicated in FIG. 9, includes a FIB-SR Common Header. The FIB-SR Common Header carries the common information which is applicable to all routers encoded in the chain of bit strings. An example of a FIB-SR Common Header is presented in FIG. 10.

Figure 10:
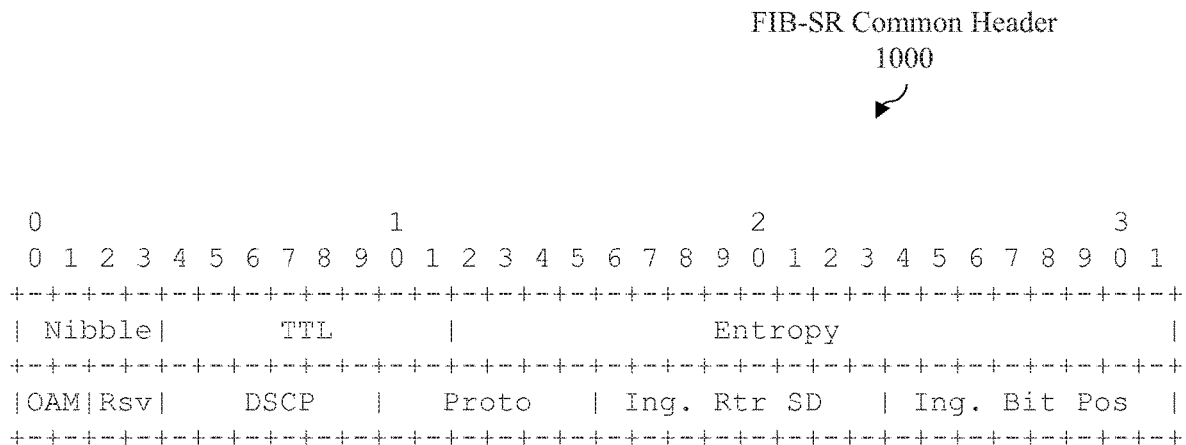
FIG. 10 depicts an example embodiment of a common header portion for a header of a source routed packet configured for packet forwarding based on flexible path encoding

As depicted in FIG. 10, the fields in the FIB-SR Common Header 1000 include a Nibble field, a Time to Live (TTL) field, an Entropy field, an Operations, Administration, and Maintenance (OAM) field, a Reserved (Rsv) field, a Differentiated Services Code Point (DSCP) field, a Protocol (Proto), an Ingress Router SD (Ing. Rtr. SD) field, and an Ingress Router Bit Position (Ing. Bit Pos.) field.

The Nibble field (4 bits) is set to the binary value 0101. This field is applicable when the FIB-SR packet is encapsulated in an MPLS label; it ensures that MPLS ECMP logic will not confuse the remainder of the FIB-SR Header with an IP header. If the FIB-SR Header is received with any other value in the Nibble field after an MPLS label, then the packet is discarded.

The TTL field (8 bits) is used to prevent FIB-SR packets from looping indefinitely in the event of improper operation of the control plane in programming the segments. A router that processes a FIB-SR packet decrements the value in this field by 1, before forwarding the packet.

The Entropy field (20 bits) specifies an "entropy" value that can be used for load-balancing purposes. The FIB-SR forwarding process may do equal-cost load balancing in case of processing based on Loose Source Route. In that case, the load-balancing procedure chooses the same path for any two packets that have the same entropy value and the same stack of bit strings.

The OAM field (2 bits) is set to 0 by the ingress router and is not modified by other forwarding routers. These two bits have no effect on the path taken by a FIB-SR packet and have no effect on the quality of service applied to a FIB-SR packet. The use of these bits in other than in this default manner is optional for OAM packets.

The Rsv field (2 bits) is currently unused. This field is set to 0 upon transmission and is ignored upon reception.

The DSCP field (6 bits) encodes the DSCP values that indicate the QoS desired by a packet. IANA has a registry called "DSCP Code Points" and this field is to be populated with the appropriate entry from that registry.

The Proto field (6 bits) is a "Next Protocol" field that identifies the type of the Payload immediately following the FIB-SR Header. IANA has a registry called "Assigned Internet Protocol Numbers" and this field is to be populated with the appropriate entry from that registry.

The Ingress Router SD field (8 bits) is the SD of the ingress router in the SD. This field is encoded as an unsigned integer in the range [0,255].

The Ingress Router Bit Position field (8 bits) is the bit position of the ingress router in the bit string of its SD. This field is encoded as an unsigned integer in the range [1,255].

It will be appreciated that the FIB-SR Common Header may be organized in other ways, may include other information, or the like, as well as various combinations thereof.

The FIB-SR Header, as indicated in FIG. 9, includes a stack of one or more Bit String Headers. An example of a Bit String Header is presented in FIG. 11.

Figure 11:
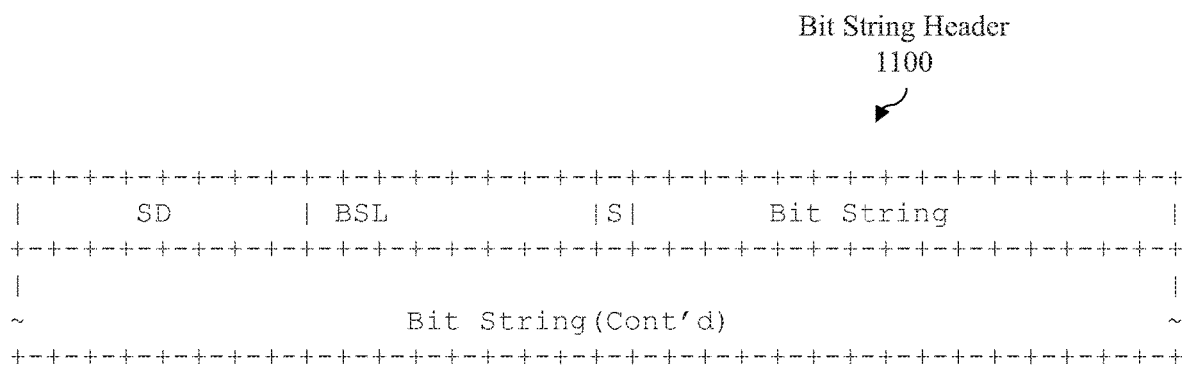
FIG. 11 depicts an example embodiment of a bit string header configured to encode a bit string configured for packet forwarding based on flexible path encoding.

As depicted in FIG. 11, the fields in the Bit String Header 1100 include an SD field, a Bit String Length (BSL) field, a Stack (S) field, and a Bit String field.

The SD field (8 bits) encodes the SD associated with the bit string in this header. This field is encoded as an unsigned integer in the range [0,255].

The BSL field encodes the length of the bit string in this header less 1. This field is encoded as an unsigned integer in the range [0-255]. For example, if the value is 71 then the length of bit string is 72.

The S field (1 bits) is a "stack" bit which indicates if there are more Bit String Headers after this header. If the value is 1, then it means that this header is the bottom of the stack of Bit String Headers (i.e., there are no more Bit String Headers). If the value is 0, then it means that more Bit String Headers follow. It is noted that different values may be used for these purposes.

The Bit String field (variable sized) is a variable length field that includes the bit positions of segments in the explicit path in the SD. The length of the bit string is specified in the BSL field.

It will be appreciated that a Bit String Header may be organized in other ways, may include other information, or the like, as well as various combinations thereof.

It will be appreciated that a FIB-SR packet may be organized in other ways, may include other information, or the like, as well as various combinations thereof.

FIGS. 12A-12D depict an example embodiment of pseudocode for originating a source routed packet configured for packet forwarding based on flexible path encoding. The pseudocode 1200 includes the procedures performed by an ingress router for originating a source routed packet, such as a FIB-SR packet, for a specific flow. It is noted that the control plane at the ingress router programs the forwarding state of a flow with the list of SD specific bit strings that forms the explicit path of the FIB-SR packet, including the flow specific parameters such as node protection detour, entropy, and so forth. So, the state of a flow can be denoted as: Flow_State={BitStrings_By_SD[ ], Global_MP, Entropy}. In this flow state, BitStrings_By_SD[ ] is an array, wherein each entry in the array is a variable length bit string specific to a SD, wherein a bit string encodes the segments to be traversed by the packet in the SD (with each entry being of type <SD, BSL, BitString>). In this flow state, Global_MP is the optional node protection detour path, of type <SD, BitPos>. In this flow state, Entropy is the entropy associated with the flow. It is noted that the manner in which the ingress router classifies incoming packets from a non-FIB-SR domain into a flow is omitted for purposes of clarity. The ingress router invokes the procedure Originate_FIB_SR_Packet(..) to originate a FIB-SR packet for a specific flow. The inputs to the procedure are as follows: (1) Packet, which is the packet to be sent with the FIB-SR Header (which is the incoming packet from non-FIB-SR domain classified into a flow), (2) Flow_State, which is the state of the flow, (3) Proto, which is the type of the packet, (4) DSCP, which is the DSCP code point for the packet, and (5) TTL, which is the TTL for the packet. It is noted that Proto, DSCP, and TTL may vary based on the types of packets in the flow and, thus, are not part of Flow_State. A description of the Originate_FIB_SR_Packet(..) procedure follows.

In the Originate_FIB_SR_Packet(..) procedure, the originated packet is to be forwarded based on the first bit string in the chain of bit strings, wherein each bit string represents an SD to be traversed by the packet. The chain of bit strings is denoted by the array Flow_State->BitStrings_By_SD[ ].

At step 1201, the BIFT for the SD of the first bit string, i.e., Flow_State->BitStrings_By_SD[0]->SD is looked up. The resultant BIFT is denoted as Forwarding_Table.

At step 1202, the Forwarding bit mask (F_BM) of the BIFT is bitwise ANDed with the first bit string. This operation results in the bit position in the BIFT that identifies the next hop segment for the packet.

At step 1203, the bit position is looked up in the BIFT to obtain its forwarding state (i.e., next-hop information and so forth), which is denoted herein as Forwarding_State.

At step 1204, the first bit string header to be inserted into the packet is encoded, which is denoted as First_BitString-Header. First_BitStringHeader is subject to change as the algorithm proceeds, depending on the forwarding state of the bit position.

At step 1205, if the forwarding state of the bit position identifies a local segment (e.g., adjacency segment), then the bit is reset in the First_BitStringHeader as the segment terminates at this router.

At step 1206, if the forwarding state of the bit position indicates that the next-hop is operational, then the next-hop is used for forwarding the packet and step 1209 of the algorithm is executed.

At step 1206, if the next-hop is not operational, then steps 1207 and 1208 are executed to look for options for fast-rerouting the packet around the failed next-hop.

At step 1207, if the failed next-hop has a link protection detour path and the detour path is operational, then the packet is forwarded to the first hop of the detour path. At step 1207.1, the bit position of the first adjacency segment in the detour path is obtained by a bitwise AND operation between the F_BM of the BIFT and the bit string of the detour path. At step 1207.2, the forwarding state of the bit position is looked up in the BIFT. At step 1207.3, the packet is to be forwarded to the next-hop in the forwarding state. At step 1207.4, the bit string of the detour path except the bit position is superimposed onto the bit string of the First_BitStringHeader of the packet by bitwise-OR operation. The algorithm then proceeds to step 1209.

At step 1208, if the failed next-hop does not have a link protection detour path or the detour path is not operational, then Global Merge Point (Global_MP) is used for fast-rerouting the packet, if Global_MP is available in the flow state. The fast-rerouting using Global_MP is executed at step 1208. At step 1208.1, the BIFT for the Global_MP is looked up by the SD associated with the Global_MP. At step 1208.2, forwarding state for the Global_MP is looked up in BIFT by the bit position of the Global_MP. At step 1208.3, if the next-hop in the forwarding state of the Global_MP is operational, then it is chosen for forwarding the packet. At steps 1208.4 and 1208.5, if the next-hop is not operational, then (1) if a backup next-hop exists, then the backup next-hop is chosen for forwarding the packet (at step 1208.4) or (2) if a backup next-hop does not exist, then there is no way to forward the packet and, thus, the packet is dropped (at step 1208.5) and the algorithm terminates. At step 1208.6, the Global_MP is encoded as the only bit in a bit string header, which results in a loose source route containing the Global_MP as the only next segment. At step 1208.7, the bit string header is pushed onto the packet and the algorithm proceeds to step 1213 to send the packet to the next-hop obtained at step 1208.3.

At step 1209, which is reached when either the primary next-hop of the bit position is operational or the next-hop of its link protection detour is operational, the first bit string header (First_BitStringHeader) for the packet encoded with its finalized bit string has already been obtained.

At step 1210, if the flow state has a Global_MP available, then the Global_MP is encoded and pushed onto the packet.

At step 1211, the chain of bit strings (for the SDs to be traversed by the packet) is encoded and pushed onto the packet, with the exception of the first bit string (since the algorithm rather uses the bit string in First_BitStringHeader).

At step 1212, the first bit string header is now pushed onto the packet and the encoding of the FIB-SR packet is now complete with the exception of the FIB-SR Common Header.

At step 1213, the FIB-SR packet is sent to its resultant next-hop, which includes pushing the FIB-SR Common Header onto the packet (at step 1213.1), pushing the layer-2 header for the next-hop onto the packet (at step 1213.2), and dispatching the FIB-SR packet onto the wire (at step 1213.3).

It will be appreciated that origination of a source routed packet configured for packet forwarding based on flexible path encoding may be performed using various other functions and, thus, that pseudocode 1200 may be modified in various ways to support packet forwarding based on flexible path encoding (e.g., using various functions presented herein).

FIGS. 13A-13C depict an example embodiment of pseudocode for processing a source routed packet configured for packet forwarding based on flexible path encoding. The pseudocode 1300 includes the procedures performed by a router that receives a source routed packet, such as a FIB-SR packet. The receiving router may invoke the procedure Process_FIB_SR_Packet(..) to process the FIB-SR Packet. The input to the algorithm is the FIB-SR packet having the FIB-SR Header at the top. A description of the Process_FIB_SR_Packet(..) procedure follows.

In the Process_FIB_SR_Packet(..) procedure, the packet is to be processed and forwarded based on the first bit string header in the FIB-SR Packet, wherein each bit string header represents a SD to be traversed by the packet. The chain of bit string headers is denoted by the array Packet->BitString-Headers[ ].

At step 1301, the BIFT for the SD of the first bit string header, i.e., Packet->BitStringHeaders[0]->SD, is looked up. The resultant BIFT is denoted as Forwarding_Table.

At step 1302, the Forwarding bit mask (F_BM) of the BIFT is bitwise ANDed with the bit string of Packet->BitStringHeaders[0]. This operation results in the bit position in the BIFT that identifies the next hop segment for the packet.

At step 1303, the bit position is looked up in the BIFT to obtain its forwarding state (i.e., next-hop information and so forth), which is denoted herein as Forwarding State.

At step 1304, if the forwarding state of the bit position identifies a local segment (e.g., adjacency segment), then the bit is reset in the bit string of Packet->BitStringHeaders[0] as the segment terminates at this router.

At step 1305, if the forwarding state of the bit position indicates that the next-hop is operational, then the next-hop is used for forwarding the packet and step 1308 of the algorithm is executed.

At step 1305, if the next-hop is not operational, then steps 1306 and 1307 are executed to look for options for fast-rerouting the packet around the failed next-hop.

At step 1306, if the failed next-hop has a link protection detour path and the detour path is operational, then the packet is forwarded to the first hop of the detour path. At step 1306.1, the bit position of the first adjacency segment in the detour path is obtained by a bitwise AND operation between the F_BM of the BIFT and the bit string of the detour path. At step 1306.2, the forwarding state of the bit position is looked up in the BIFT. At step 1306.3, the packet is to be forwarded to the next-hop in the forwarding state. At step 1306.4, the bit string of the detour path except the bit position is superimposed onto the bit string of Packet->BitStringHeaders[0] by bitwise-OR operation. The algorithm then proceeds to step 1308.

At step 1307, if the failed next-hop does not have a link protection detour path or the detour path is not operational, then Global Merge Point (Global_MP) is used for fast-rerouting the packet, if Global_MP is available in the packet. Fast-rerouting using Global_MP is executed at step 1307. The fast-rerouting using Global_MP is executed at step 130. At step 1307.1, the BIFT for the Global_MP is looked up by the SD associated with the Global_MP. At step 1307.2, forwarding state for the Global_MP is looked up in BIFT by the bit position of the Global_MP. At step 1307.3, if the next-hop in the forwarding state of the Global_MP is operational, then it is chosen for forwarding the packet. At steps 1307.4 and 1307.5, if the next-hop is not operational, then (1) if a backup next-hop exists, then the backup next-hop is chosen for forwarding the packet (at step 1307.4) or (2) if a backup next-hop does not exist, then there is no way to forward the packet and, thus, the packet is dropped (at step 1307.5) and the algorithm terminates. At step 1307.6, the existing bit string headers are removed from the packet, since the packet is now being rerouted using Global_MP. At step 1307.7, the Global_MP is encoded as the only bit in a bit string header, which results in a loose source route containing the Global_MP as the only next segment. At step 1307.8, the bit string header is pushed onto the packet. At step 1307.9, the encoded Global_MP is removed from the packet since Global_MP is now encoded in bit string header of the packet and the algorithm proceeds to step 1309 to send the packet to the next-hop obtained at step 1307.3.

At step 1308, which is reached when either the primary next-hop of the bit position is operational or the next-hop of its link protection detour is operational and is executed if the bit string of the first bit string header is empty (i.e., Packet->BitStringHeaders[0] is empty), Packet->BitString-Headers[0] is removed from the packet and, if no more bit string header exists, then FIB-SR Common Header is removed from the packet and Global_MP (if present) is removed from the packet.

At step 1309, the FIB-SR packet is sent to its resultant next-hop, which includes pushing the layer-2 header for the next-hop (at step 1309.1) and then dispatching the FIB-SR packet onto the wire (at step 1309.2).

It will be appreciated that processing of a source routed packet configured for packet forwarding based on flexible path encoding may be performed using various other functions and, thus, that pseudocode 1300 may be modified in various ways to support packet forwarding based on flexible path encoding (e.g., using various functions presented herein).

It will be appreciated that various example embodiments for supporting forwarding of source routed packets based on flexible path encoding based on use of a forwarding plane configured to support forwarding of source routed packets based on flexible path encoding may be configured to provide various other functions for supporting forwarding of source routed packets based on flexible path encoding.

Various example embodiments for supporting forwarding of source routed packets based on flexible path encoding may be configured to support forwarding of source routed packets based on flexible path encoding based on use of a control plane configured to support forwarding of source routed packets based on flexible path encoding.

In at least some embodiments, in which FIB-SR packets are encapsulated within an MPLS label(s), the receiving router of the FIB-SR packet may advertise a label to its neighbors in the FIB-SR network. When a FIB-SR packet sent to the receiving router is encapsulated within the advertised label, it indicates to the receiving router that the underlying packet is a FIB-SR packet. In at least some embodiments, a control plane protocol (e.g., LDP, BGP, OSPF, IS-IS, or the like) may be used to advertise the label mapping. In at least some embodiments, the label allocation and mapping can be explicitly programmed into each router by a centralized controller (e.g., an SDN controller).

In at least some embodiments, the SD and bit position assignments to a router (e.g., its prefix segment and adjacency segments for its local adjacencies) can be performed using a manual configuration process at each router and then flooding of the SD and bit position assignments through the network. The flooding of the SD and bit position assignments through the network may be performed using a control plane protocol (e.g., BGP, OSPF, IS-IS, or the like) using Link State Advertisements (LSAs) of the control plane protocol. In at least some embodiments, the SD and bit position assignments to a router (e.g., its prefix segment and adjacency segments for its local adjacencies) can be performed centrally through a central controller (e.g., an SDN controller).

It will be appreciated that various example embodiments for supporting forwarding of source routed packets based on flexible path encoding based on use of a control plane configured to support forwarding of source routed packets based on flexible path encoding may be configured to provide various other functions for supporting forwarding of source routed packets based on flexible path encoding.

Figure 14:
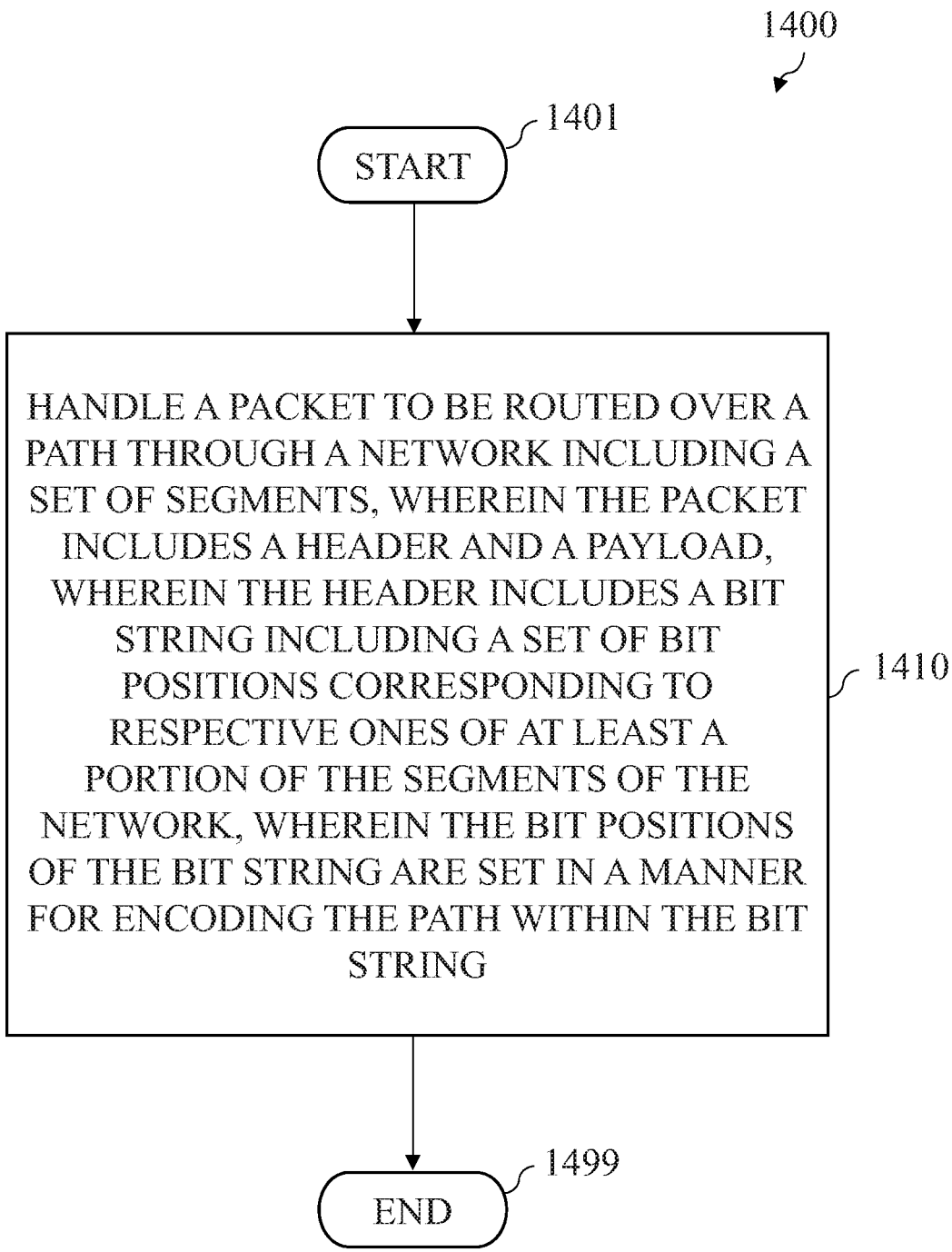
FIG. 14 depicts an example embodiment of a method for supporting handling of a packet based on flexible path encoding.

FIG. 14 depicts an example embodiment of a method for supporting handling of a packet based on flexible path encoding. It will be appreciated that, although primarily presented as being performed serially, at least a portion of the functions of method 1400 may be performed contemporaneously or in a different order than as presented with respect to FIG. 14. At block 1401, method 1400 begins. At block 1410, handle a packet to be routed over a path through a network including a set of segments, wherein the packet includes a header and a payload, wherein the header includes a bit string including a set of bit positions corresponding to respective ones of at least a portion of the segments of the network, wherein the bit positions of the bit string are set in a manner for encoding the path within the bit string. At block 1499, method 1400 ends. It will be appreciated that the packet may be a source routed packet, a segment routed packet, or other suitable type of packet. It will be appreciated that various functions presented herein with respect to FIGS. 1-13 may be incorporated within the context of method 1400 of FIG. 14.

Various example embodiments for supporting forwarding of packets in packet switched networks based on flexible path encoding may provide various advantages or potential advantages. For example, example embodiments for supporting forwarding of source routed packets in packet switched networks based on flexible path encoding may significantly reduce the overhead of encoding the explicit path within the segment routed packet (e.g., since a single bit offers a shortest form of representation of a segment identifier of a segment for source routing and since the length of the variable sized bit string is equal to the highest bit position encoded in the variable sized bit string even though other bit positions may be represented in the network). For example, example embodiments for supporting forwarding of source routed packets in packet switched networks based on flexible path encoding may significantly reduce the overhead of forwarding lookups along the explicit path (e.g., as indicated above, the forwarding operation can be performed with a single lookup (i.e., formally O(1) lookup)), and may provide various other advantages or potential advantages. Various example embodiments for supporting forwarding of packets in packet switched networks based on flexible path encoding may provide various other advantages or potential advantages.

Figure 15:
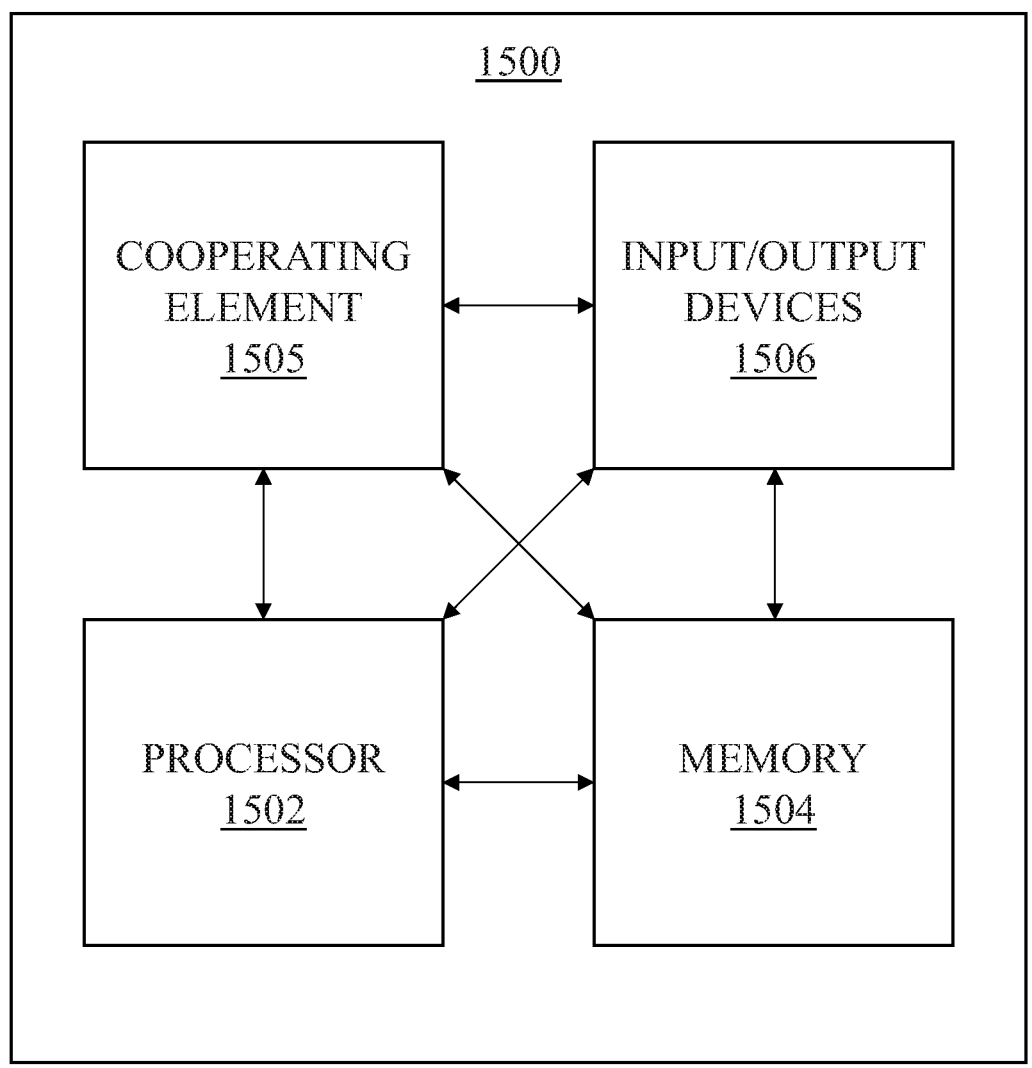
FIG. 15 depicts an example embodiment of a computer suitable for use in performing various functions presented herein.

FIG. 15 depicts an example embodiment of a computer suitable for use in performing various functions presented herein.

The computer 1500 includes a processor 1502 (e.g., a central processing unit, a processor, a processor having a set of processor cores, a processor core of a processor, or the like) and a memory 1504 (e.g., a random access memory, a read only memory, or the like). The processor 1502 and the memory 1504 may be communicatively connected. In at least some embodiments, the computer 1500 may include at least one processor and at least one memory including computer program code, wherein the at least one memory and the computer program code are configured to, with the at least one processor, cause the computer to perform various functions presented herein.

The computer 1500 also may include a cooperating element 1505. The cooperating element 1505 may be a hardware device. The cooperating element 1505 may be a process that can be loaded into the memory 1504 and executed by the processor 1502 to implement various functions presented herein (in which case, for example, the cooperating element 1505 (including associated data structures) can be stored on a non-transitory computer-readable storage medium, such as a storage device or other suitable type of storage element (e.g., a magnetic drive, an optical drive, or the like)).

The computer 1500 also may include one or more input/output devices 1506. The input/output devices 1506 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 1500 may represent a general architecture and functionality suitable for implementing functional elements described herein, portions of functional elements described herein, or the like, as well as various combinations thereof. For example, computer 1500 may provide a general architecture and functionality that is suitable for implementing one or more elements presented herein, such as a router 111 or a portion thereof, a source routing element 112 or a portion thereof, a controller 120 or a portion thereof, a source routing element 121 or a portion thereof, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory including program code;
   wherein the at least one memory and the program code are configured to, with the at least one processor, cause the apparatus to at least:
      handle a packet to be routed over a path through a network toward an egress node of the path, wherein the network includes a set of segments, wherein the packet includes a header and a payload, wherein the header includes a bit string including a set of bit positions corresponding to respective ones of at least a portion of the segments of the network, wherein the bit positions of the bit string are set in a manner for encoding the path and for encoding a protection path configured to protect at least a portion of the path.

2. The apparatus of claim 1, wherein the packet comprises a source routed packet.

3. The apparatus of claim 1, wherein the packet comprises a segment routed packet.

4. The apparatus of claim 1, wherein the set of segments of the network includes at least one of one or more single-hop segments or one or more multi-hop segments.

5. The apparatus of claim 1, wherein the set of segments of the network includes a set of prefix segments and a set of adjacency segments.

6. The apparatus of claim 1, wherein a number of bit positions included in the bit string is based on ones of the segments of the network that form the path and ones of the segments of the network that form the protection path.

7. The apparatus of claim 6, wherein the number of bit positions included in the bit string is equal to a highest bit position associated with the ones of the segments of the network that form the path and the ones of the segments of the network that form the protection path.

8. The apparatus of claim 1, wherein, to handle the packet, the at least one memory and the program code are configured to, with the at least one processor, cause the apparatus to at least:
receive, by a router, the payload;
identify, by the router, ones of the segments of the network of which the path is composed;
generate, by the router based on the ones of the segments of the network of which the path is composed, the header; and
form, by the router based on association of the header with the payload, the packet.

9. The apparatus of claim 1, wherein, to handle the packet, the at least one memory and the program code are configured to, with the at least one processor, cause the apparatus to at least:
receive, by a router, the packet;
identify, by the router, one of the bit positions of the bit string for which the router has forwarding state; and
determine, by the router based on a forwarding state, forwarding of the packet.

10. The apparatus of claim 9, wherein, to handle the packet, the at least one memory and the program code are configured to, with the at least one processor, cause the apparatus to at least:
forward, by the router based on a determination based on the forwarding state that a next-hop of the path is available, the packet.

11. The apparatus of claim 10, wherein the at least one memory and the program code are configured to, with the at least one processor, cause the apparatus to at least:
update, by the router based on a determination that the one of the bit positions of the bit string for which the router has forwarding state represents a local segment of the router, the packet by resetting the one of the bit positions of the bit string for which the router has forwarding state.

12. The apparatus of claim 11, wherein the at least one memory and the program code are configured to, with the at least one processor, cause the apparatus to at least:
reduce a length of the bit string, by removing one or more of the bit positions of the bit string, based on a determination that a most significant bit of the bit string is not set after the resetting of the one of the bit positions of the bit string for which the router has forwarding state.

13. The apparatus of claim 9, wherein, to handle the packet, the at least one memory and the program code are configured to, with the at least one processor, cause the apparatus to at least:
determine, by the router based on a determination based on the forwarding state that a next-hop of the path is unavailable, forwarding of the packet using the protection path; and
forward, by the router via the protection path, the packet.

14. The apparatus of claim 13, wherein the protection path includes one or more protection hops, wherein the at least one memory and the program code are configured to, with the at least one processor, cause the apparatus to at least:
update, by the router prior to forwarding the packet via the protection path, the bit string to set at least one bit position corresponding to at least one of the protection hops.

15. The apparatus of claim 14, wherein the update of the bit string includes increasing a length of the bit string to include one or more additional bit positions.

16. The apparatus of claim 1, wherein the protection path is a link protection detour path.

17. The apparatus of claim 1, wherein the protection path is a node protection detour path.

18. The apparatus of claim 1, wherein, to handle the packet, the at least one memory and the program code are configured to, with the at least one processor, cause the apparatus to at least:
receive, by a router, the packet;
determine, for a failure associated with forwarding of the packet from the router, whether the failure is a link failure or a node failure; and
initiate a reroute of the packet using the protection path based on whether the failure is a link failure or a node failure.

19. A non-transitory computer-readable medium storing instructions configured to cause an apparatus to at least:
handle a packet to be routed over a path through a network toward an egress node of the path, wherein the network includes a set of segments, wherein the packet includes a header and a payload, wherein the header includes a bit string including a set of bit positions corresponding to respective ones of at least a portion of the segments of the network, wherein the bit positions of the bit string are set in a manner for encoding the path and for encoding a protection path configured to protect at least a portion of the path.

20. A method, comprising:
handling a packet to be routed over a path through a network toward an egress node of the path, wherein the network includes a set of segments, wherein the packet includes a header and a payload, wherein the header includes a bit string including a set of bit positions corresponding to respective ones of at least a portion of the segments of the network, wherein the bit positions of the bit string are set in a manner for encoding the path and for encoding a protection path configured to protect at least a portion of the path.

* * * * *